(12) United States Patent
Deng et al.

(10) Patent No.: US 12,316,880 B2
(45) Date of Patent: May 27, 2025

(54) REFERENCE PICTURE RESAMPLING

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Ye-kui Wang, San Diego, CA (US); Kai Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/523,025

(22) Filed: Nov. 29, 2023

(65) Prior Publication Data

US 2024/0107071 A1 Mar. 28, 2024

Related U.S. Application Data

(63) Continuation of application No. 18/074,887, filed on Dec. 5, 2022, which is a continuation of application No. PCT/CN2021/097844, filed on Jun. 2, 2021.

(30) Foreign Application Priority Data

Jun. 4, 2020 (WO) ................ PCT/CN2020/094397
Jun. 11, 2020 (WO) ................ PCT/CN2020/095688
Jun. 22, 2020 (WO) ................ PCT/CN2020/097390

(51) Int. Cl.
*H04N 19/70* (2014.01)
*H04N 19/105* (2014.01)
*H04N 19/174* (2014.01)

(52) U.S. Cl.
CPC ........... *H04N 19/70* (2014.11); *H04N 19/105* (2014.11); *H04N 19/174* (2014.11)

(58) Field of Classification Search
CPC ..... H04N 19/70; H04N 19/105; H04N 19/174
See application file for complete search history.

(56) References Cited

U.S. PATENT DOCUMENTS 10,136,152 B2 11/2018 Hendry
10,390,020 B2 8/2019 Chang
(Continued)

FOREIGN PATENT DOCUMENTS

CN 101646084 A 2/2010
CN 104365099 A 2/2015
(Continued)

OTHER PUBLICATIONS

Document: JVET-S0092, Samuelsson, J., et al., "On constraint info signalling," Joint Video Experts Team (JVET) of ITU-T SG 16 WP 3 and ISO/IEC JTC 1/SC 29/WG 11 19th Meeting: by teleconference, Jun. 22-Jul. 1, 2020, 3 pages.
(Continued)

*Primary Examiner* — Joseph W Becker
(74) *Attorney, Agent, or Firm* — Conley Rose, P.C.

(57) ABSTRACT

Examples of video encoding methods and apparatus and video decoding methods and apparatus are described. An example method of video processing includes performing a conversion between a current picture of a video and a bitstream of the video according to a rule. The rule specifies that a number of entries in a reference picture list of the current picture is greater than 0 in response to (1) one or more slices in the current picture being allowed to have a slice type other than an Intra (I) slice type, and (2) reference picture list (RPL) information being present in a picture header.

20 Claims, 13 Drawing Sheets

600 performing a conversion between a video and a coded representation of the video — 602

(56) References Cited

U.S. PATENT DOCUMENTS

| | | | |
|---|---|---|---|
| 11,611,778 | B2 | 3/2023 | Samuelsson |
| 11,924,475 | B2 | 3/2024 | Deng |
| 2016/0360198 | A1 | 12/2016 | Chang |
| 2020/0177923 | A1 | 6/2020 | Chen |
| 2022/0060752 | A1 | 2/2022 | Pettersson |
| 2022/0217347 | A1 | 7/2022 | Chernyak |
| 2022/0286667 | A1 | 9/2022 | Lu |

FOREIGN PATENT DOCUMENTS

| | | |
|---|---|---|
| CN | 106165427 | 11/2016 |
| CN | 106464911 A | 2/2017 |
| CN | 106165427 B | 2/2019 |
| JP | 2022549911 A | 11/2022 |
| WO | 2019191218 A1 | 10/2019 |
| WO | 2020031061 A2 | 2/2020 |

OTHER PUBLICATIONS

Document: JVET-S0152-v3, Wang, Y., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.

"Information technology—High efficiency coding and media delivery in heterogeneous environments—Part 2: High efficiency video coding", ISO/IEC JTC 1/SC 29/WG 11 N17661, Rec. ITU-T H.265 | ISO/IEC 23008-2:201x (4th Ed.) (in force edition), Apr. 20, 2018, 8 pages.

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., VTM software, Retrieved from the internet: https://vcgit.hhi.fraunhofer.de/ivct/VVCSoftwargVTM.git, Feb. 27, 2023, 3 pages.

Document: JVET-R0253, Yu, R., et al., "AHG9: Three restrictions when RPL is present in PH," Joint Video Experts Team (JVET) of ITU-T SG 16 WP 3 and ISO/IEC JTC 1/SC 29/WG 11 18th Meeting: by teleconference, Apr. 15-24, 2020, 3 pages.

Document: JVET-Q0043, Nishi, T., et al., "AHG9: Constraint about usage of reference picture resampling and subpictures," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.

Document: JVET-Q0625-v4, Boyce, J., "Report of BoG on high level tool control, feature combinations, and parameter sets," Joint Video Experts Team (JVET) of ITU-T SG 16 WP 3 and ISO/IEC JTC 1/SC 29/WG 11 17th Meeting: Brussels, BE, Jan. 7-17, 2020, 22 pages.

Document: JVET-O0417-v1, Bordes, P., et al., "AHG17: On general constraint information," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.

Document: JVET-R0192, Hendry, "AHG9: On signalling recovery point picture," Joint Video Experts Team (JVET) of ITU-T SG 16 WP 3 and ISO/IEC JTC 1/SC 29/WG 11 18th Meeting: by teleconference, Apr. 15-24, 2020, 4 pages.

Document: JVET-S2001-v5, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 538 pages.

Document: JVET-S0130-v3, Li, L., et al., "On chroma QP mapping," Joint Video Experts Team (JVET) of ITU-T SG 16 WP 3 and ISO/IEC JTC 1/SC 29/WG 11 19th Meeting: by teleconference, Jun. 22-Jul. 1, 2020, 6 pages.

Foreign Communication From a Related Counterpart Application, PCT Application No. PCT/CN2021/097844, International Search Report dated Aug. 30, 2021, 10 pages.

Foreign Communication From a Related Counterpart Application, Indian Application No. 202227070068, Indian Office Action dated Feb. 17, 2023, 8 pages.

Foreign Communication From a Related Counterpart Application, PCT Application No. PCT/CN2021/101389, International Search Report dated Sep. 26, 2021, 13 pages.

Foreign Communication From a Related Counterpart Application, PCT Application No. PCT/CN2021/101390, International Search Report dated Sep. 27, 2021, 13 pages.

Extended European Search Report from European Application No. 21827968.5 dated Oct. 20, 2023, 11 pages.

Non-Final Office Action from U.S. Appl. No. 18/085,988 dated Jul. 5, 2023, 19 pages.

Non-Final Office Action from U.S. Appl. No. 18/074,887 dated Apr. 7, 2023, 14 pages.

Final Office Action from U.S. Appl. No. 18/074,887 dated Jul. 17, 2023, 9 pages.

Document: JVET-S0241, Hendry, et al., "AHG9: On signalling of POC MSB information B43in picture header," Joint Video Experts Team (JVET) of ITU-T SG 16 WP 3 and ISO/IEC JTC 1/SC 29/WG 11 19th Meeting: by teleconference, Jun. 22-Jul. 1, 2020, 3 pages.

Extended European Search Report from European Application No. 23220634.2 dated Mar. 18, 2024, 14 pages.

Japanese Notification of Reasons for Refusal from Japanese Application No. 2022-577200 dated Mar. 12, 2024, 6 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Foreign Communication From A Related Counterpart Application, Office Action for Indian Application No. 202227074501, mailed Mar. 8, 2023, 6 Pages.

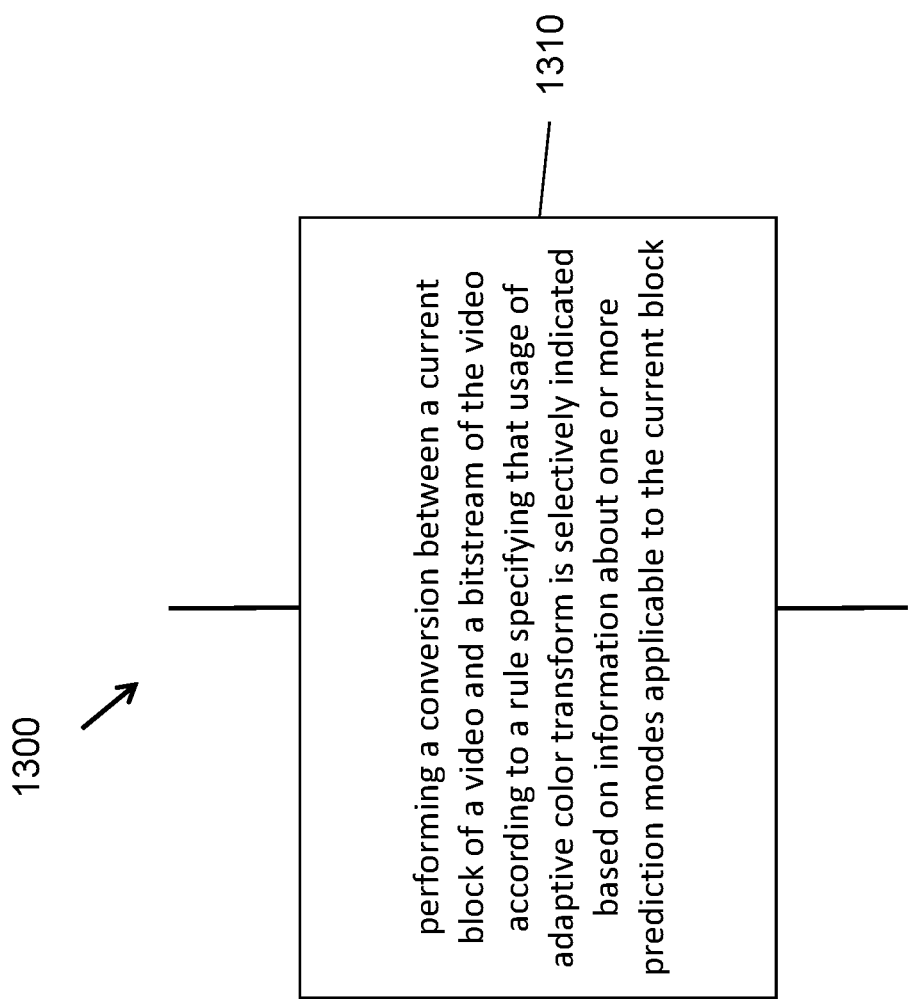

REFERENCE PICTURE RESAMPLING

CROSS-REFERENCE TO RELATED APPLICATIONS

This application is a continuation application of U.S. patent application Ser. No. 18/074,887 filed on Dec. 5, 2022, which is a continuation of International Patent Application No. PCT/CN2021/097844 filed on Jun. 2, 2021, which claims the priority to and benefits of PCT Patent Application No. PCT/CN2020/094397 filed on Jun. 4, 2020, PCT Patent Application No. PCT/CN2020/095688 filed on Jun. 11, 2020, and PCT Patent Application No. PCT/CN2020/097390 filed on Jun. 22, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders to perform video encoding or decoding.

In one example aspect, a method of processing video data is disclosed. The method includes performing a conversion between a current picture of a video and a bitstream of the video according to a rule. The rule specifies that a number of entries in a reference picture list of the current picture is greater than 0 in response to (1) one or more slices in the current picture being allowed to have a slice type other than an Intra (I) slice type, and (2) reference picture list (RPL) information being present in a picture header.

In another example aspect, a method of processing video data is disclosed. The method includes performing a conversion between a current picture of a video and a bitstream of the video according to a rule. The rule specifies that a variable indicating a number of subpictures in each picture of the video is not used to derive a first syntax flag that indicates whether a reference picture resampling constraint is satisfied.

In another example aspect, a method of processing video data is disclosed. The method includes performing a conversion between a current picture of a video and a bitstream of the video according to a rule. The rule specifies that a syntax flag indicating whether a reference picture resampling constraint is satisfied is determined based on whether subpictures of the current picture are treated as pictures in the conversion.

In another example aspect, a method of processing video data is disclosed. The method includes performing a conversion between a current picture of a video and a bitstream of the video according to a rule. The rule specifies that a syntax flag indicating whether a reference picture resampling constraint is satisfied is determined based on whether the current picture and a reference picture of the current picture are in a same layer and/or whether inter-layer prediction is allowed for the conversion.

In another example aspect, a method of processing video data is disclosed. The method includes performing a conversion between a video and a bitstream of the video according to a rule. The rule specifies that a value of a first syntax element in a picture header or a slice header is constrained by a value of a second syntax element in an access unit delimiter (AUD) present in the bitstream.

In another example aspect, a method of processing video data is disclosed. The method includes performing a conversion between a video and a bitstream of the video according to a rule. The rule specifies that whether a syntax element in a general constraint information syntax structure in present in the bitstream is based on a number of constraint bytes or reserved bytes being greater than 0.

In another example aspect, a method of processing video data is disclosed. The method includes performing a conversion between a current block of a video and a bitstream of the video according to a rule. The rule specifies that usage of adaptive color transform is selectively indicated based on information about one or more prediction modes applicable to the current block.

In another example aspect, a video processing method is disclosed. The method includes performing a conversion between a video and a coded representation of the video, wherein the coded representation conforms to a format rule, wherein the format rule specifies usage of a syntax field indicative of applicability of reference picture resampling to a corresponding segment of video.

In another example aspect, another video processing method is disclosed. The method includes performing a conversion between a video and a coded representation of the video, wherein the coded representation conforms to a format rule, wherein the format rule specifies constraining a value of a first syntax element in a picture header or a slice header based on a value of a second syntax element corresponding to an access unit delimiter.

In another example aspect, another video processing method is disclosed. The method includes performing a conversion between a video and a coded representation of the video, wherein the coded representation conforms to a format rule, wherein the format rule specifies whether and how one or more syntax elements in a general constraint information field are included.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thercon is disclosed. The code embodies one of the methods described herein in the form of processor-executable code.

These, and other, features are described throughout the present disclosure.

BRIEF DESCRIPTION OF DRAWINGS

FIG. 13 is a flowchart representation of yet another method for processing video data in accordance with one or more embodiments of the present disclosure.

DETAILED DESCRIPTION

Figure 1:
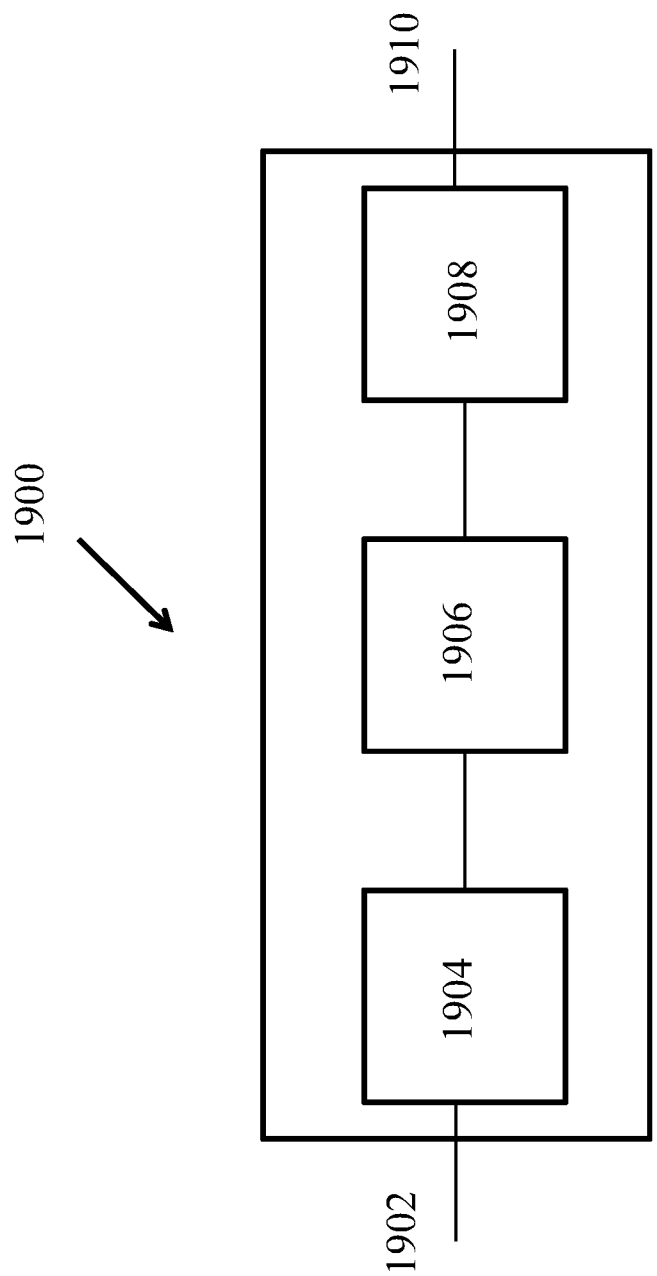
FIG. 1 is a block diagram that illustrates a video coding system in accordance with some embodiments of the present disclosure.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed embodiments. As such, the embodiments described herein are applicable to other video codec protocols and designs also.

1. Overview

This present disclosure is related to video coding technologies. Specifically, it is about the derivation of reference picture resampling (RPR) flag variable, the relationship between access limit delimiter (AUD) and syntax elements, and signalling of general constraints information (GCI) in video coding in other NAL units in video coding. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
BDOF Bi-Directional Optical Flow
CLVS Coded Layer Video Sequence
CPB Coded Picture Buffer
CRA Clean Random Access
CTU Coding Tree Unit
CVS Coded Video Sequence
DMVR Decoder-Side Motion Vector Refinement
DPB Decoded Picture Buffer
DPS Decoding Parameter Set
EOB End Of Bitstream
EOS End Of Sequence
GCI General Constraints Information
GDR Gradual Decoding Refresh
HEVC High Efficiency Video Coding
HRD Hypothetical Reference Decoder
IBC Intra Block Copy
IDR Instantaneous Decoding Refresh
IRAP Intra Random Access Point
JEM Joint Exploration Model
MCTS Motion-Constrained Tile Sets
NAL Network Abstraction Layer
OLS Output Layer Set
PH Picture Header
POC Picture Order Count
PPS Picture Parameter Set
PROF Prediction Refinement With Optical Flow
PTL Profile, Tier and Level
PU Picture Unit
QP Quantization Parameter
RRP Reference Picture Resampling
RBSP Raw Byte Sequence Payload
SE Syntax Element
SEI Supplemental Enhancement Information
SH Slice Header
SPS Sequence Parameter Set
SVC Scalable Video Coding
VCL Video Coding Layer
VPS Video Parameter Set
VTM VVC Test Model
VUI Video Usability Information
VVC Versatile Video Coding 3. Video Coding Introduction Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting a 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Resolution Change within a Sequence

In AVC and HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signalled in the PPS instead of in the SPS, while in the SPS the maximum picture resolution is signalled. ii) For a single-layer bitstream, each picture store (a slot in the DPB for storage of one decoded picture) occupies the buffer size as required for storing a decoded picture having the maximum picture resolution.

3.2. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high level syntax (HLS) aspects have been significantly simplified at the sacrifice of some flexibilities. For example, an IRAP AU is required to contain a picture for each of the layers present in the CVS.

3.3. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.4. Semantics of RPR Related Syntax Elements and the Variable Flag

The semantics of RPR related syntax elements and the derivation of the variable flag are as follows in the latest VVC draft text:

7.4.3.3 Sequence Parameter Set RBSP Semantics sps_ref_pic_resampling_enabled_flag equal to 1 specifies that reference picture resampling is enabled and a current picture referring to the SPS may have slices that refer to a reference picture in an active entry of a reference picture list that has one or more of the following 7 parameters different than that of the current picture: 1) pps_pic_width_in_luma_samples, 2) pps_pic_height_in_luma_samples, 3) pps_scaling_win_left_offset, 4) pps_scaling_win_right_offset, 5) pps_scaling_win_top_offset, 6) pps_scaling_win_bottom_offset, and 7) sps_num_subpics_minus1. sps_ref_pic_resampling_enabled_flag equal to 0 specifies that reference picture resampling is disabled and no current picture referring to the SPS may have slices that refer to a reference picture in an active entry of a reference picture list that has one or more of the above 7 parameters different than that of the current picture.

NOTE 3—When sps_ref_pic_resampling_enabled_flag is equal to 1, for a current picture the reference picture that has one or more of the above 7 parameters different than that of the current picture may either belong to the same layer or a different layer than the layer containing the current picture.

sps_res_change_in_clvs_allowed_flag equal to 1 specifies that the picture spatial resolution may change within a CLVS referring to the SPS. sps_res_change_in_clvs_allowed_flag equal to 0 specifies that the picture spatial resolution does not change within any CLVS referring to the SPS. When not present, the value of sps_res_change_in_clvs_allowed_flag is inferred to be equal to 0.

8.3.2 Decoding Process for Reference Picture Lists Construction

3.5. Access Unit Delimiter (AUD)

The syntax and semantics of AUD in the latest VVC draft text are as follows:

| access_unit_delimiter_rbsp( ) { | Descriptor |
|---|---|
| aud_irap_or_gdr_au_flag | u(1) |
| aud_pic_type | u(3) |
| rbsp_trailing_bits( ) | |
| } | |

The AU delimiter is used to indicate the start of an AU, whether the AU is an IRAP or GDR AU, and the type of slices present in the coded pictures in the AU containing the AU delimiter NAL unit. When the bitstream contains only one layer, there is no normative decoding process associated with the AU delimiter. aud_irap_or_gdr_au_flag equal to 1 specifies that the AU containing the AU delimiter is an IRAP or GDR AU. aud_irap_or_gdr_au_flag equal to 0 specifies that the AU containing the AU delimiter is not an IRAP or GDR AU.

aud_pic_type indicates that the sh_slice_type values for all slices of the coded pictures in the AU containing the AU delimiter NAL unit are members of the set listed in Table 7 for the given value of aud_pic_type. The value of aud_pic_type shall be equal to 0, 1 or 2 in bitstreams conforming to this version of this Specification. Other values of aud_pic_type are reserved for future use by ITU-T|ISO/IEC. Decoders conforming to this version of this Specification shall ignore reserved values of aud_pic_type.

TABLE 7

| Interpretation of aud_pic_type | |
|---|---|
| aud_pic_type | sh_slice_type values that may be present in the AU |
| 0 | I |
| 1 | P, I |
| 2 | B, P, I |

...
   fRefWidth is set equal to CurrPicScalWinWidthL of the reference picture RefPicList[ i ][ j ]
   fRefHeight is set equal to CurrPicScalWinHeightL of the reference picture RefPicList[ i ][ j ]
   refPicWidth, refPicHeight, refScalingWinLeftOffset, refScalingWinRightOffset, refScalingWinTopOffset,
       and refScalingWinBottomOffset, are set equal to the values of pps_pic_width_in_luma_samples,
       pps_pic_height_in_luma_samples, ppsscalingwinleftoffset, pps_scaling_win_right_offset,
       pps_scaling_win_top_offset, and pps_scaling_win_bottom_offset,
respectively, of the reference
       picture RefPicList i ] [ j ]
   fRefNumSubpics is set equal to sps_num_subpics_minus1 of the reference picture RefPicList[ i ][ j ]
   RefPicScale[ i ][ j ][ 0 ] = ( (fRefWidth << 14 ) + ( CurrPicScalWinWidthL >> 1 ) ) /
       CurrPicScalWinWidthL
   RefPicScale[ i ][ j ][ 1 ] = ((fRefHeight << 14 ) + ( CurrPicScalWinHeightL >> 1 ) ) /
       CurrPicScalWinHeightL
   RprConstraintsActiveFlag[ i ][ j ] = (pps_pic_width_in_luma_samples != refPicWidth ||
| |
       pps_pic_height_in_luma_samples != refPicHeight ||
       pps_scaling_win_left_offset != refScalingWinLeftOffset ||
       pps_scaling_win_right_offset != refScalingWinRightOffset ||
       pps_scaling_win_top_offset != refScalingWinTopOffset ||
       pps_scaling_win_bottom_offset != refScalingWinBottomOffset ||
       sps_num_subpics_minus1 != fRefNumSubpics )
...

3.6. GCI (General Constraint Information)

In the latest VVC draft text, the general profile, tier, level syntax and semantics are as follows:

7.3.3 Profile, Tier, and Level Syntax

7.3.3.1 General Profile, Tier, and Level Syntax

| profile_tier_level( profileTierPresentFlag, maxNumSubLayersMinus1 ) { | Descriptor |
|---|---|
| if( profileTierPresentFlag ) { | |
|   general_profile_idc | u(7) |
|   general_tier_flag | u(1) |
|   general_constraint_info( ) | |
| } | |
| general_level_idc | u(8) |
| if( profileTierPresentFlag ) { | |
|   ptl_num_sub_profiles | u(8) |
|   for( i = 0; i < ptl_num_sub_profiles; i++ ) | |
|     general_sub_profile_idc[ i ] | u(32) |
| } | |
| for( i = 0; < maxNumSubLayersMinus1; i++ ) | |
|   ptl_sublayer_level_present_flag[ i ] | u(1) |
| while( !byte_aligned( ) ) | |
|   ptl_alignment_zero_bit | f(1) |
| for( i = 0; i < maxNumSubLayersMinus1; i++ ) | |
|   if( ptl_sublayer_level_present_flag[ i ] ) | |
|     sublayer_level_idc[ i ] | u(8) |
| } | |

7.3.3.2 General Constraint Information Syntax

| general_constraint_info( ) { | Descriptor |
|---|---|
| general_non_packed_constraint_flag | u(1) |
| general_frame_only_constraint_flag | u(1) |
| general_non_projected_constraint_flag | u(1) |
| general_one_picture_only_constraint_flag | u(1) |
| intra_only_constraint_flag | u(1) |
| max_bitdepth_constraint_idc | u(4) |
| max_chroma_format_constraint_idc | u(2) |
| single_layer_constraint_flag | u(1) |
| all_layers_independent_constraint_flag | u(1) |
| no_ref_pic_resampling_constraint_flag | u(1) |
| no_ref_change_in_clvs_constraint_flag | u(1) |
| one_tile_per_pic_constraint_flag | u(1) |
| pic_header_in_slice_header_constraint_flag | u(1) |
| one_slice_per_pic_constraint_flag | u(1) |
| one_subpic_per_pic_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_ccalf_constraint_flag | u(1) |
| no_joint_cbcr_constraint_flag | u(1) |
| no_mrl_constraint_flag | u(1) |
| no_isp_constraint_flag | u(1) |
| no_mip_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_lfnst_constraint_flag | u(1) |
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ibc_constraint_flag | u(1) |
| no_ciip_constraint_flag | u(1) |
| no_gpm_constraint_flag | u(1) |
| no_ladf_constraint_flag | u(1) |
| no_transform_skip_constraint_flag | u(1) |
| no_bdpcm_constraint_flag | u(1) |
| no_palette_constraint_flag | u(1) |
| no_act_constraint_flag | u(1) |
| no_lmcs_constraint_flag | u(1) |
| no_cu_qp_delta_constraint_flag | u(1) |
| no_chroma_qp_offset_constraint_flag | u(1) |
| no_dep_quant_constraint_flag | u(1) |
| no_sign_data_hiding_constraint_tlag | u(1) |
| no_tsrc_constraint_flag | u(1) |
| no_mixed_nalu_types_in_pic_constraint_flag | u(1) |
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| while( !byte_aligned( ) ) | |
|   gci_alignment_zero_bit | f(1) |
| gci_num_reserved_bytes | u(8) |
| for( i = 0; i < gci_num_reserved_bytes; i++ ) | |
|   gci_reserved_byte[ i ] | u(8) |
| } | |

3.7. Conditional Signalling of GCI Fields

In some embodiments, the GCI syntax structure has been changed. The GCI extension length indicator (gci_num_reserved_bytes) is moved from last to first (gci_num_constraint_bytes) in the GCI syntax structure to enable skip signalling of the GCI fields. The value of gci_num_reserved_bytes shall be equal to either 0 or 9.

The added or modified portions are underlined in boldface italics, and the deleted parts are indicated using [[ ]] below.

| general_constraint_info( ) { | Descriptor |
|---|---|
| *gcu_num_constraint_bytes* | *u(8)* |
| *if(gci_num_constraint_bytes > 8)* | |
| *{* | |
|   general_non_packed_constraint_flag | u(1) |
|   general_frame_only_constraint_flag | u(1) |
|   ... /* 61 more syntax elements */ | |
|   no_aps_constraint_flag | u(1) |
|   while( !byte_aligned( ) ) | |
|     gci_alignment_zero_bit | f(1) |
| } | |
| [[gci_num_reserved_bytes | u(8)]] |
| for( i = 0; i < gci_num_[[reserved]]*constraint* bytes — 9; i++ ) | |
|   gci_reserved_byte[ i ] | u(8) |
| } | |

3.8. Luma-Chroma QP Mapping Table 7.3.2.3 Sequence Parameter Set RBSP Syntax

| seq_parameter_set_rbsp( ) { | Descriptor |
|---|---|
| sps_seq_parameter_set_id | u(4) |
| ... | |
| if( ChromaArrayType != 0 ) { | |
|   sps_joint_cbcr_enabled_flag | u(1) |
|   sps_same_qp_table_for_chroma_flag | u(1) |
|   numQpTables = sps_same_qp_table_for_chroma_flag ? 1 : | |
|     ( sps_joint_cbcr_enabled_flag ? 3 : 2 ) | |
|   for( i = 0; i < numQpTables; i++ ) { | |
|     sps_qp_table_start_minus26[ i ] | se(v) |
|     sps_num_points_in_qp_table_minus1[ i ] | ue(v) |
|     for( j = 0; j <= | |
|     sps_num_points_in_qp_table_minus1[ i ]; j++ ) { | |
|       sps_delta_qp_in_val_minus1[ i ][ j ] | ue(v) |
|       sps_delta_qp_diff_val[ i ][ j ] | ue(v) |
|     } | |
|   } | |
| } | |
| ... | |
| } | | sps_qp_table_start_minus26[i] plus 26 specifies the starting luma and chroma QP used to describe the i-th chroma QP mapping table. The value of sps_qp_table_start_minus26[i] shall be in the range of −26−QpBdOffset to 36 inclusive. When not present, the value of sps_qp_table_start_minus26[i] is inferred to be equal to 0.

sps_num_points_in_qp_table_minus1[i] plus 1 specifies the number of points used to describe the i-th chroma QP mapping table. The value of sps_num_points_in_qp_table_minus1[i] shall be in the range of 0 to 63+QpBdOffset, inclusive. When not present, the value of
sps_num_points_in_qp_table_minus1[0] is inferred to be equal to 0.

sps_delta_qp_in_val_minus1[i][j] specifies a delta value used to derive the input coordinate of the j-th pivot point of the i-th chroma QP mapping table. When not present, the value of
sps_delta_qp_in_val_minus1[0][j] is inferred to be equal to 0.

sps_delta_qp_diff_val[i][j] specifies a delta value used to derive the output coordinate of the j-th pivot point of the i-th chroma QP mapping table.

The i-th chroma QP mapping table ChromaQpTable[i] for i=0. . numQpTables−1 is derived as follows:

```
qpInVal[i][0]=sps_qp_table_start_minus26[i]+26
qpOutVal[i][0]=qpInVal[i][0]
for(j=0;   j<=sps_num_points_in_qp_table_minus1[i];
    j++) {
  qpInVal[i][j+1]=qpInVal[i][j]+sps_delta_qp_in_
    val_minus1[i][j]+1
  qpOutVal[i][j+1]=qpOutVal[i][j]+
    (sps_delta_qp_in_val_minus1[i][j]
     ˆsps_delta_qp_diff_val[i][j])
}
ChromaQpTable[i][qpInVal[i][0]]=qpOutVal[i][0]
for(k=qpInVal[i][0]−1; k>=−QpBdOffset; k−−)
  ChromaQpTable[i][k]=Clip3(−QpBdOffset, 63, Chro-
    maQpTable[i][k+1]−1)
  (63)
for(j=0;   j<=sps_num_points_in_qp_table_minus1[i];
    j++) {
  sh=(sps_delta_qp_in_val_minus1[i][j]+1)>>1
  for(k=qpInVal[i][j]+1, m=1; k<=qpInval[i][j+1]; k++,
      m++)
    ChromaQpTable[i][k]=ChromaQpTable[i][qpInVal[i]
      [j]]+
    ((qpOutVal[i][j+1]−qpOutVal[i][j])*m+sh)/
    (sps_delta_qp_in_val_minus1[i][j]+1)
}
for(k=qpInVal[i][sps_num_points_in_qp_table_minus1
    [i]+1]+1; k<=63; k++)
  ChromaQpTable[i][k]=Clip3(−QpBdOffset, 63, Chro-
    maQpTable[i][k−1]+1)
```

When sps_same_qp_table_for_chroma_flag is equal to 1, ChromaQpTable[1][k] and ChromaQpTable[2][k] are set equal to ChromaQpTable[0][k] for k in the range of −QpBdOffset to 63, inclusive.

It is a requirement of bitstream conformance that the values of qpInVal[i][j] and qpOutVal[i][j] shall be in the range of −QpBdOffset to 63, inclusive for i in the range of 0 to numQpTables−1, inclusive, and j in the range of 0 to sps_num_points_in_qp_table_minus1[i]+1, inclusive.

4. Technical Problems Addressed by Disclosed Technical Solutions

The existing designs for RPR, AU delimiter and GCI have the following problems:

(1) The involving of the sps_num_subpics_minus1 for the semantics of sps_ref_pic_resampling_enabled_flag and the derivation of the flag variable RprConstraintsActiveFlag[i][j] is too restrictive than necessary. It would disable the use of all tools disabled when RprConstraintsActiveFlag[i][j] is equal to 1 for a current picture when the reference picture has different number of subpictures while all the subpictures in the current picture have sps_subpic_treated_as_pic_flag[ ] equal to 0.

(2) Currently, in the AU delimiter (a.k.a., AUD) syntax structure, two syntax elements (e.g., aud_irap_or_gdr_au_flag and aud_pic_type) are signalled for an AU to indicate whether it is an IRAP/GDR AU and the picture type of the AU. The AUD SEs are not used in any other part of the decoding process. However, in the PH, there is an SE (e.g., ph_gdr_or_irap_pic_flag) expressing similar intent as aud_irap_or_gdr_au_flag. It is asserted that the value of the PH SE can be constrained by the value of AUD SE when the AUD is present. Moreover, in the SH, there is an SE, sh_slice_type, can be constrained the by value of aud_pic_type as well.

(3) The designs for GCI signalling in the latest VVC draft text and in some embodiments have byte alignment in between the GCI fields and the extension bytes. Consequently, in a potential future extension, when new GCI fields need to be added, they would be added after the current by alignment bits, and after that, another byte alignment would need to be added.

(4) The designs for GCI signalling in some embodiments uses an 8-bit syntax element to specify the number of bytes for GCI fields, byte alignment bits, and extension bytes. However, for VVC version 1, the value of the syntax element is required to be equal to 0 or 9, i.e., 0 or a particular greater-than-zero integer value (depending on the number of bits needed for all the GCI fields in VVC version 1). In a potential future extension, after certain new GCI fields are added, the value of that 8-bit syntax element would need to be equal to 0 or another particular value that is greater than 9, e.g., 11 if 9 to 16 more bits are needed for the new GCI fields. That means, in any version of VVC, the value of the 8-bit syntax element would be equal to 0 or a particular greater-than-zero integer value. Therefore, there is no need to signal the 8-bit value, but just signal a 1 bit flag would be sufficient, and derive the value according to the value of the flag.

(5) It is asserted that the relationship of whether inter-related syntax elements signalled in the PH and whether non-empty RPL0 signalled in the PH is not well established. For example, when the Reference Picture List (RPL) is sent in the PH and list0 is empty, it may constrain the value of ph_inter_slice_allowed_flag to be equal to 0. And vice visa.

(6) It is asserted that in case of a GDR picture with zero recovery POC distance, the GDR picture itself is a recovery point picture. And this should be considered/expressed in the spec.

(7) Considering the mixed NAL unit type and bitstream extraction and merging, a single GCI flag may be signalled to constrain both sps_idr_rpl_present_flag and pps_mixed_nalu_types_in_pic_flag.

5. A Listing of Embodiments

To solve the above problems and some other problems not mentioned, methods as summarized below are disclosed. The embodiments should be considered as examples to explain the general concepts and should not be interpreted in a narrow way. Furthermore, these embodiments can be applied individually or combined in any manner.

1) To solve the first problem, the derivation of the RprConstraintsActiveFlag[i][j] is changed to not involve sps_num_subpics_minus1, and a NOTE is added to clarify that, when the value of sps_num_subpics_minus1 is different for the current picture and the reference picture RefPicList[i][j], and for the current picture sps_subpic_treated_as_pic_flag[k] is equal to 1 for at least one value of k in the range of 0 to sps_num_subpics_minus1, inclusive, all tools, e.g., PROF, that cannot be used when RprConstraintsActiveFlag[i][j] is equal to 1 need to be turned off by the encoder, otherwise the bitstream would be a non-conforming bitstream due to that the extracted subpicture for which sps_subpic_treated_as_pic_flag[k] is equal to 1 would not be correctly decodable.
   a. In one example, in addition, the semantics of sps_ref_pic_resampling_enabled_flag is changed to not involve sps_num_subpics_minus1.
   b. The above statements should only be applied when interlayer prediction is allowed.
2) To solve the first problem, the derivation of the RprConstraintsActiveFlag is further dependent on whether subpictures are treated as pictures.
   a. In one example, the derivation of the RprConstraintsActiveFlag[i][j] is changed such that it may depend on the at least one of values of sps_subpic_treated_as_pic_flag[k] for k ranging from 0 to sps_num_subpics_minus1, inclusive, for the current picture.
   b. In one example, the derivation of the RprConstraintsActiveFlag[i][j] is changed such that it may depend on whether at least one of sps_subpic_treated_as_pic_flag[k] for k ranging from 0 to sps_num_subpics_minus1, inclusive, for the current picture is equal to 1.
   c. Alternatively, furthermore, when the numbers of subpictures between a current picture and its reference picture are different and the current picture has none of subpictures treated as picture (e.g., all value of sps_subpic_treated_as_pic_flag are false), then RPR may still be enabled.
      i. Alternatively, furthermore, the RprConstraintsActiveFlag[i][j] may be set according to other conditions (e.g., scaling window sizes/offsets).
   d. Alternatively, furthermore, when the numbers of subpictures between a current picture and its reference picture are different and the current picture has at least one subpicture treated as picture (e.g., sps_subpic_treated_as_pic_flag is true), then RPR is always enabled, regardless of values of other syntax elements (e.g., scaling windows).
      i. Alternatively, furthermore, the RprConstraintsActiveFlag[i][j] is set to true for the above mentioned case.
   e. Alternatively, furthermore, when the RprConstraintsActiveFlag[i][j] is true, multiple tools (e.g., PROF/BDOF/DMVR) may be disabled accordingly.
      i. When the RprConstraintsActiveFlag[i][j] may be equal to true after an extraction, multiple tools (e.g., PROF/BDOF/DMVR) may be disabled accordingly.
   f. Alternatively, a conformance bitstream shall satisfy that for a subpicture in a current picture which is treated as picture and the numbers of subpictures between the current picture and its reference picture are different, the coding tools (e.g., PROF/BDOF/DMVR) which are dependent on the checking of RprConstraintsActiveFlag[i][j] may be disabled.
   g. Alternatively, whether to invoke decoding process for the coding tools (e.g., PROF/BDOF/DMVR) may be dependent on whether the current subpicture in a current picture is treated as picture and numbers of subpictures between the current picture and its reference picture.
      i. In one example, if current subpicture in a current picture is treated as picture and the numbers of subpictures between the current picture and its reference picture are different, those coding tools are disabled regardless the SPS enabling flags.
3) To solve the first problem, the derivation of the RprConstraintsActiveFlag[i][j] is changed such that it may depend on whether the current picture and the reference picture belong to the same layer and/or whether inter-layer prediction is allowed.
4) To solve the second problem, regarding constraining the value of PH/SH SE by the AUD SE, one or more of the following approaches are disclosed:
   a. In one example, constrain the value of the SPS/PPS/APS/PH/SH syntax elements based on the value of the AUD syntax elements when present.
   b. In one example, constrain the value of the syntax element specifying whether it is a GDR/IRAP picture or not (e.g., the PH syntax element ph_gdr_or_irap_pic_flag) based on whether it is a GDR/IRAP AU or not (e.g., the value of the AUD syntax element aud_irap_or_gdr_au_flag) when present.
   c. For example, when the AUD syntax element specifies that the AU containing the AU delimiter is not an IRAP or GDR AU (e.g., aud_irap_or_gdr_au_flag is equal to 0), the value of the associated PH syntax element ph_gdr_or_irap_pic_flag shall be not equal to a certain value (such as 1) specifying the picture is a IRAP or GDR picture, e.g., the following constraints may be added:

i. When aud_irap_or_gdr_au_flag is present and equal to 0 (not IRAP or GDR), the value of ph_gdr_or_irap_pic_flag shall be not equal to 1 (IRAP or GDR).
ii. Alternatively, when aud_irap_or_gdr_au_flag is equal to 0 (not IRAP or GDR), the value of ph_gdr_or_irap_pic_flag shall be not equal to 1 (IRAP or GDR).
iii. Alternatively, when aud_irap_or_gdr_au_flag is present and equal to 0 (not IRAP or GDR), the value of ph_gdr_or_irap_pic_flag shall be equal to 0 (may or may not IRAP or GDR).
iv. Alternatively, when aud_irap_or_gdr_au_flag is equal to 0 (not IRAP or GDR), the value of ph_gdr_or_irap_pic_flag shall be equal to 0 (may or may not IRAP or GDR).

d. In one example, constrain the value of the syntax element specifying the slice type (e.g., the SH syntax element sh_slice_type) based on the value of the AUD syntax element (e.g., aud_pic_type) when present.
i. For example, when the AUD syntax element specifies that the sh_slice_type values that may be present in the AU are Intra (I) slices (e.g., aud_pic_type is equal to 0), the value of the associated SH syntax element sh_slice_type shall be not equal to a certain value (such as 0/1) specifying Predicted (P)/Bidirectional predicted (B) slices, e.g., the following constraints may be added:
1. When aud_pic_type is present and equal to 0 (I slice), the value of sh_slice_type shall be equal to 2 (I slice).
2. Alternatively, when aud_pic_type is equal to 0 (I slice), the value of sh_slice_type shall be equal to 2 (I slice).
3. Alternatively, when aud_pic_type is present and equal to 0 (I slice), the value of sh_slice_type shall be not equal to 0 (B slice) or 1 (P slice).
4. Alternatively, when aud_pic_type is equal to 0 (I slice), the value of sh_slice_type shall be not equal to 0 (B slice) or 1 (P slice).

e. For example, when the AUD syntax element specifies that the sh_slice_type values that may be present in the AU are P or I slices (e.g., aud_pic_type is equal to 1), the value of the associated SH syntax element sh_slice_type shall not be not equal to a certain value (such as 0) specifying B slices, e.g., the following constraints may be added:
i. When aud_pic_type is present and equal to 1 (P, I slices may present), the value of sh_slice_type shall be equal to 1 (P slice) or 2 (I slice).
ii. Alternatively, when aud_pic_type is equal to 1 (P, I slices may present), the value of sh_slice_type shall be equal to 1 (P slice) or 2 (I slice).
iii. Alternatively, when aud_pic_type is present and equal to 1 (P, I slices may present), the value of sh_slice_type shall be not equal to 0 (B slice).
iv. Alternatively, when aud_pic_type is equal to 1 (P, I slices may present), the value of sh_slice_type shall be not equal to 0 (B slice).

f. In one example, the indicator values of related syntax elements in AUD syntax structure and PH/SH syntax structure may be aligned.
i. For example, aud_pic_type equal to 0 indicates the sh_slice_type values that may be present in the AU are B or P or I slices.
ii. For example, aud_pic_type equal to 1 indicates the sh_slice_type values that may be present in the AU are P or I slices.
iii. For example, aud_pic_type equal to 2 indicates the sh_slice_type values that may be present in the AU are I slices.
iv. Alternatively, sh_slice_type equal to 0 indicates the coding type of the slice are I slices.
v. Alternatively, sh_slice_type equal to 1 indicates the coding type of the slice are P slices.
vi. Alternatively, sh_slice_type equal to 2 indicates the coding type of the slice are B slices.

g. In one example, the names of related syntax elements in AUD syntax structure and PH/SH syntax structure may be aligned.
i. For example, aud_irap_or_gdr_au_flag may be renamed as aud_gdr_or_irap_au_flag.
ii. Alternatively, ph_gdr_or_irap_pic_flag may be renamed as ph_irap_or_gdr_pic_flag.

h. In one example, the value of the syntax element specifying whether a picture is an IRAP or GDR picture or not (e.g., ph_gdr_or_irap_pic_flag equal to 0 or 1, and/or ph_gdr_pic_flag equal to 0 or 1, and/or a PH SE named ph_irap_pic_flag equal to 0 or 1) may be constrained based on whether the bitstream is a single-layer bitstream and whether the picture belongs to an IRAP or GDR AU.
i. For example, when the bitstream is a single-layer bitstream (e.g., when the VPS syntax element vps_max_layers_minus1 is equal to 0, and/or the SPS syntax element sps_video_parameter_set_id is equal to 0), and the AUD syntax element specifies that the AU containing the AU delimiter is not an IRAP or GDR AU (e.g., aud_i-rap_or_gdr_au_flag is equal to 0), the following constraints may be added:
1. The value of the associated PH syntax element ph_gdr_or_irap_pic_flag shall not be equal to a certain value (such as 1) specifying the picture is a IRAP or GDR picture.
2. The value of the associated PH syntax element ph_gdr_pic_flag shall not be equal to a certain value (such as 1) specifying the picture is a GDR picture.
3. Suppose there is a PH SE named ph_irap_pic_flag and ph_irap_pic_flag equal to a certain value (such as 1) specifying the picture is surely an IRAP picture, then under the above condition, the value of the associated PH syntax element ph_gdr_irap_flag shall not be equal to 1.
ii. For example, when the bitstream is a single-layer bitstream (e.g., when the VPS syntax element vps_max_layers_minus1 is equal to 0, and/or the SPS syntax element sps_video_parameter_set_id is equal to 0), and the AUD syntax element specifies that the AU containing the AU delimiter is an IRAP or GDR AU (e.g., aud_i-rap_or_gdr_au_flag is equal to 1), the following constraints may be added:
1. Suppose there is a PH SE named ph_irap_pic_flag and ph_irap_pic_flag equal to a certain value (such as 1) specifying the picture is surely an IRAP picture, then under the above condition, either ph_gdr_pic_flag or ph_irap_flag shall be equal 1.

iii. For example, when vps_max_layers_minus1 (or, sps_video_parameter_set_id) is equal to 0 (single layer), and aud_irap_or_gdr_au_flag is present and equal to 0 (not IRAP or GDR AU), the following constraints are made:
  1. The value of ph_gdr_or_irap_pic_flag shall be not equal to 1 (IRAP or GDR picture).
    a. Alternatively, the value of ph_gdr_or_irap_pic_flag shall be equal to 0 (the picture may or may not be an IRAP picture and is surely not a GDR picture).
  2. Additionally, alternatively, the value of ph_gdr_pic_flag shall be not equal to 1 (GDR picture).
    a. Alternatively, the value of ph_gdr_pic_flag shall be equal to 0 (the picture is surely not a GDR picture).
  3. Alternatively, alternatively, the value of ph_i-rap_pic_flag (named, if any) shall be not equal to 1 (surely IRAP picture).
    a. Alternatively, the values of ph_irap_pic_flag (named, if any) shall be equal to 0 (the picture is surely not an IRAP picture).
5) To solve the 3rd problem, whether to signal the GCI syntax elements in GCI syntax structure may depend on whether the signalled/derived number of constraint/reserved bytes (e.g., the gci_num_constraint_bytes in JVET-S0092-v1) is unequal to 0 or greater than 0.
  a. In one example, the GCI syntax in JVET-S0092-v1 is changed such that (1) the condition "if(gci_num_constraint_bytes>8)" is changed to be "if (gci_num_constraint_bytes>0)"; (2) the byte alignment, i.e., the syntax element gci_alignment_zero_bit together with its condition "while (!byte_aligned( ))", is removed; and (3) the signalling of the reserved bytes (i.e., gci_reserved_byte[i]) is changed to be signalling of the served bits (i.e., gci_reserved_bit[i]) in a way such that the total number of bits under the condition "if(gci_num_constraint_bytes>0)" is equal to gci_num_constraint_bytes*8.
  b. Alternatively, furthermore, the number of constraint/reserved bytes (e.g., gci_num_constraint_bytes in JVET-S0092) may be restricted to given values which may depend on the GCI syntax elements/profile/tile/version of standard information.
    i. Alternatively, furthermore, the other un-zero value is set to Ceil(Log 2(numGciBits)) wherein the variable numGciBits is derived to be equal to the number of bits for all the syntax elements under the condition "if(gci_num_constraint_bytes>0)", excluding the gci_reserved_bit[i] syntax elements.
6) To solve the 4th problem, a flag may be used to indicate the presence of GCI syntax elements/or GCI syntax structure and when the GCI syntax elements are present, zero or one or multiple reserved bits may be further signalled.
  a. In one example, the GCI syntax in JVET-S0092-v1 is changed such that (1) the 8-bit gci_num_constraint_bytes is replaced with a one-bit flag, e.g., gci_present_flag; (2) the condition "if(gci_num_constraint_bytes>8)" is changed to be "if (gci_present_flag)"; (3) the byte alignment, i.e., the syntax element gci_alignment_zero_bit together with its condition "while(!byte_aligned( ))", is removed; and (4) the signalling of the reserved bytes (i.e., gci_reserved_byte[i]) is changed to be signalling of the reserved bits (i.e., gci_reserved_bit[i]) in a way such that the total number of bits under the condition "if(gci_present_flag)" is equal to gciNumConstraintBytes*8, where gciNumConstraintBytes is derived according to the value of gci_present_flag.
  b. Alternatively, furthermore, the number of constraint/reserved bytes (e.g., gci_num_constraint_bytes in JVET-S0092) (e.g., signalled or derived) may be which may depend on the GCI syntax elements/profile/tile/version of standard information.
    i. Alternatively, furthermore, the other un-zero value is set to Ceil(Log 2(numGciBits)) wherein the variable numGciBits is derived to be equal to the number of bits for all the syntax elements under the condition "if(gci_present_flag>0)", excluding the gci_reserved_bit[i] syntax elements.
  c. Alternatively, furthermore, when the flag indicates GCI syntax elements are not present, 7-bit reserved bits may be further signalled.
    i. In one example, the 7-bit reserved bits are 7 zero bits.
  d. Alternatively, furthermore, move the GCI syntax structure to be after the general_sub_profile_idc or after the ptl_sublayer_level_present_flag[i] or right before the while loop (for the byte alignment) in the PTL syntax structure.
    i. Alternatively, furthermore, when the flag indicates GCI syntax elements are present, the GCI syntax structure (e.g., general_constraint_info( )) is further signalled.
    ii. Alternatively, furthermore, when the flag indicates GCI syntax elements are not present, the GCI syntax structure (e.g., general_constraint_info( )) is not signalled and values of GCI syntax elements are set to default values.

Adaptive Color Transform (ACT) Related
  7) The signalling of ACT usage (e.g., ACT on/off control flag) may be skipped based on the prediction modes information.
    a. In one example, whether to signal the indication of ACT on/off flag may depend on whether the prediction mode for the current block is non-intra (e.g., not MODE_INTRA) and/or non-inter (e.g., not MODE_INTER) and/or non-IBC (e.g., not MODE_IBC).
    b. In one example, the signalling of ACT usage (e.g., ACT on/off control flag) may be skipped when all the intra (e.g., MODE_INTRA) and inter (e.g., MODE_INTER) and IBC (e.g., MODE_IBC) modes are not applied to a video unit.
      i. Alternatively, furthermore, usage of ACT is inferred to be false when not present/signalled.
    c. In one example, when ACT is used for a block, X-mode shall not be used for that block.
      i. For example, X may be palette.
      ii. For example, X may be a mode that is different from MODE_INTRA, MODE_INTER, and MODE_IBC.
      iii. Alternatively, furthermore, usage of X-mode is inferred to be false under the above condition.

Others
  8) To solve the 5$^{th}$ problem, one or more of the following approaches are disclosed:
    a. In one example, it is required that when inter slices is allowed in a picture (e.g., ph_inter_slice_allowed_flag being equal to true), and the RPL is signalled in the PH instead of SHs, then the reference picture list 0 (e.g., RefPicList[0]) shall not be empty, i.e., to contain at least one entry.
  i. For example, a bitstream constraint may be specified that when pps_rpl_info_in_ph_flag is equal to 1 and ph_inter_slice_allowed_flag is equal to 1, the value of num_ref_entries[0][RplsIdx[0]] shall be greater than 0.
  ii. Additionally, whether to signal and/or how to signal and/or the inference of the number of reference entries in list 0 (e.g., num_ref_entries[0][RplsIdx[0]]) may depend on whether inter slices is allowed in a picture.
    1. In one example, when inter slices is allowed in a picture (e.g., ph_inter_slice_allowed_flag being equal to true), and the RPL is signalled in the PH (e.g., pps_rpl_info_in_ph_flag being equal to true), number of entries in reference picture list 0 minus 1 may be signalled instead.
    2. In one example, when inter slices is disallowed in a picture (e.g., ph_inter_slice_allowed_flag being equal to false), and the RPL is signalled in the PH (e.g., pps_rpl_info_in_ph_flag being equal to true), number of entries in reference picture list X (e.g., X being 0 or 1) is not signalled anymore.
b. In one example, it is required that when RPL is signalled in the PH instead of SHs, and the reference picture list 0 (e.g., RefPicList[0]) is empty, i.e., to contain 0 entries, then only I slices shall be allowed in a picture.
  i. For example, a bitstream constraint may be specified that when pps_rpl_info_in_ph_flag is equal to 1, and the value of num_ref_entries[0][RplsIdx[0]] is equal to 0, then the value of ph_inter_slice_allowed_flag shall be equal to 0.
  ii. Additionally, whether to signal and/or how to signal the indication of inter allowed flag (e.g., ph_inter_slice_allowed_flag) and/or intra allowed flag (e.g., the ph_intra_slice_allowed_flag) may depend on the number of entries in reference picture list 0.
    1. In one example, when pps_rpl_info_in_ph_flag is equal to 1, and the value of num_ref_entries[0][RplsIdx[0]] is equal to 0, indication of whether inter slices are allowed (e.g., the ph_inter_slice_allowed_flag) may be not signalled anymore.
      a. Alternatively, furthermore, the indication is inferred to be false.
      b. Alternatively, furthermore, another indication of whether intra slices are allowed (e.g., the ph_intra_slice_allowed_flag) may be not signalled anymore.
c. In one example, how to signal and/or whether to signal a slice type and/or inference of slice types may depend on the number of entries of reference picture list 0 and/or 1.
  i. In one example, when the reference picture list 0 (e.g., RefPicList[0]) is empty, i.e., to contain 0 entries, indication of slice type is not signalled anymore.
    1. Alternatively, furthermore, when RPL is signalled in the PH instead of SHs, and the reference picture list 0 (e.g., RefPicList[0]) is empty, i.e., to contain 0 entries, indication of slice type is not signalled anymore.
      2. Alternatively, furthermore, for the above cases, the slice type is inferred to be I slice.
    ii. In one example, when the reference picture list 0 (e.g., RefPicList[0]) is empty, i.e., to contain 0 entries, the slice type shall be equal to I slice.
    iii. In one example, when the reference picture list 1 (e.g., RefPicList[1]) is empty, i.e., to contain 0 entries, the slice type shall NOT be equal to B slice.
    iv. In one example, when the reference picture list 1 (e.g., RefPicList[1]) is empty, i.e., to contain 0 entries, the slice type shall be equal to I or P slice.
d. In one example, it is required that if RPL is signalled in the PH, it is used for all slices in the pictures, and therefore list 0 can only be empty if the whole picture contains only I slices. Otherwise, if list 0 is not empty, there must be at least one B or P slice in this picture.
9) To solve the 6$^{th}$ problem, one or more of the following approaches are disclosed:
  a. In one example, the recovery point picture shall follow the associated GDR picture in decoding order only if the recovery POC count is greater than 0.
  b. In one example, the recovery point picture is the GDR picture itself when the recovery POC count is equal to 0.
  c. In one example, the recovering picture may or may not precede the recovery point picture in decoding order.
  d. In one example, when the recovery POC count is equal to 0, the recovery point picture is the GDR picture itself, and it may or may not have recovering pictures.
  e. In one example, the semantics of ph_recovery_poc_cnt in JVET-R2001-vA may be changed as follows. Most relevant parts that have been added or modified are underlined in boldface italics, and some of the deleted parts are indicated using [[ ]]. ph_recovery_poc_cnt specifies the recovery point of decoded pictures in output order. When the current picture is a GDR picture, the variable recoveryPointPocVal is derived as follows: recoveryPointPocVal=PicOrderCntVal+ph_recovery_poc_cnt *If PicOrderCntVal is equal to 0, the GDR picture itself is referred to as the recovery point picture. Otherwise (PicOrderCntVal is greater than 0), i*[[ if the current picture is a GDR picture, and there is a picture picA that follows the current GDR picture in decoding order in the CLVS that has PicOrderCntVal equal to recoveryPointPocVal, the picture picA is referred to as the recovery point picture. Otherwise, the first picture in output order that has PicOrderCntVal greater than recoveryPointPocVal in the CLVS is referred to as the recovery point picture. The recovery point picture shall not precede the current GDR picture in decoding order. The pictures that are associated with the current GDR picture and have PicOrderCntVal less than recoveryPointPocVal are referred to as the recovering pictures of the GDR picture. The value of ph_recovery_poc_cnt shall be in the range of 0 to MaxPicOrderCntLsb−1, inclusive.
10) To solve the 7$^{th}$ problem, one or more of the following approaches are disclosed:
  a. In one example, a first GCI syntax element (e.g., named no_idr_rpl_mixed_nalu_constraint_flag)

may be signalled to limit both the RPL sent with IDR pictures and the usage of mixed NAL unit types.
  i. For example, when no_idr_rpl_mixed_nalu_constraint_flag is equal to 1, no RPL shall be signalled for IDR pictures and the VCL NAL units of each picture shall have the same value of nal_unit_type. While no_idr_rpl_mixed_nalu_constraint_flag equal to 0 does not impose such constraint.
  ii. For example, when no_idr_rpl_mixed_nalu_constraint_flag is equal to 1, reference picture list syntax elements shall not present in slice headers of IDR pictures (e.g., sps_idr_rpl_present_flag shall be equal to 0) and pps_mixed_nalu_types_in_pic_flag shall be equal to 0. While no_idr_rpl_mixed_nalu_constraint_flag equal to 0 does not impose such constraint.
  iii. For example, when the first GCI syntax element is not present (e.g., indication of presence of GCI syntax elements tells GCI syntax elements are not present), the value of the first GCI syntax element may be inferred to be X (e.g., X being 0 or 1).
11) It is proposed that the signalling and/or the range and/or the inference of a syntax element specifying the number of points in a QP table is dependent on other syntax elements.
  a. It is proposed to set the maximum value of num_points_in_qp_table_minus1[i] to (K—the starting luma and/or chroma QP used to describe the i-th chroma QP mapping table).
    i. In one example, K is dependent on the maximum allowed QP value for a video.
      1. In one example, K is set to (the maximum allowed QP value−1), e.g., 62 in VVC.
    ii. In one example, the maximum value is set to (62−(qp_table_start_minus26[i]+26) wherein sps_qp_table_start_minus26[i] plus 26 specifies the starting luma and chroma QP used to describe the i-th chroma QP mapping table.
  b. Alternatively, it is required that the sum of the number of points in a QP table (e.g., the num_points_in_qp_table_minus1 [i] for the i-th QP table) and the starting luma and/or chroma QP used to describe the i-th chroma QP mapping table (e.g., sps_qp_table_start_minus26[i] plus 26) shall be smaller than the maximum allowed QP value (e.g., 63).
12) It is a requirement of bitstream conformance that the values of qpInVal[i][j] shall be in the range of −QpBdOffset to 62, inclusive for i in the range of 0 to numQpTables−1, inclusive, and j in the range of 0 to sps_num_points_in_qp_table_minus1[i]+K (e.g., K=0 or 1), inclusive.
13) It is a requirement of bitstream conformance that the value of qpOutVal[i][j] shall be in the range of −QpBdOffset to 62, inclusive for i in the range of 0 to numQpTables−1, inclusive, and j in the range of 0 to sps_num_points_in_qp_table_minus1[i]+K (e.g., K=0 or 1), inclusive.

6. Embodiments

Below are some example embodiments for some of the aspects summarized above in this Section, which can be applied to the VVC specification. Most relevant parts that have been added or modified are underlined in boldface italics, and some of the deleted parts are indicated using [[ ]].

6.1. Embodiment 1

This embodiment is for item 1 and its sub-items.

7.4.3.3 Sequence Parameter Set RBSP Semantics sps_ref_pic_resampling_enabled_flag equal to 1 specifies that reference picture resampling is enabled and a current picture referring to the SPS may have slices that refer to a reference picture in an active entry of a reference picture list that has one or more of the following 6 [[7]] parameters different than that of the current picture: 1) pps_pic_width_in_luma_samples. 2) pps_pic_height_in_luma_samples, 3) pps_scaling_win_left_offset, 4) pps_scaling_win_right_offset. 5) pps_scaling_win_top_offset, *and* 6) pps_scaling_win_bottom_offset[[, and 7) sps_num_subpics_minus 1]]. sps_ref_pic_resampling_enabled_flag equal to 0 specifies that reference picture resampling is disabled and no current picture referring to the SPS may have slices that refer to a reference picture in an active entry of a reference picture list that has one or more of the above 6 [[7]] parameters different than that of the current picture.
  NOTE 3—When sps_ref_pic_resampling_enabled_flag is equal to 1, for a current picture the reference picture that has one or more of the above 6 [[7]] parameters different than that of the current picture may either belong to the same layer or a different layer than the layer containing the current picture.

sps_res_change_in_clvs_allowed_flag equal to 1 specifies that the picture spatial resolution may change within a CLVS referring to the SPS. sps_res_change_in_clvs_allowed_flag equal to 0 specifies that the picture spatial resolution does not change within any CLVS referring to the SPS. When not present, the value of sps_res_change_in_clvs_allowed_flag is inferred to be equal to 0.

8.3.2 Decoding Process for Reference Picture Lists Construction fRefWidth is set equal to CurrPicScalWin WidthL of the reference picture RefPicList[i][j]
fRefHeight is set equal to CurrPicScalWinHeightL of the reference picture RefPicList[i][j]
refPicWidth, refPicHeight, refScalingWinLeftOffset, refScalingWinRightOffset, refScalingWinTopOffset, and refScaling WinBottomOffset, are set equal to the values of pps_pic_width_in_luma_samples, pps_pic_height_in_luma_samples, pps_scaling_win_left_offset, pps_scaling_win_right_offset, pps_scaling_win_top_offset, and pps_scaling_win_bottom_offset, respectively, of the reference picture RefPicList[i][j]
[[fRefNumSubpics is set equal to sps_num_subpics_minus1 of the reference picture RefPicList[i][j]]]
RefPicScale[i][j][0]=((fRefWidth<<14)+ (CurrPicScalWin WidthL>>1))/ CurrPicScalWinWidthL
RefPicScale[i][j][1]=((fRefHeight<<14)+ (CurrPicScalWinHeightL>>1))/CurrPicScalWinHeightL
RprConstraintsActiveFlag[i][j]= (pps_pic_width_in_luma_samples!=refPicWidth|| pps_pic_height_in_luma_samples!=refPicHeight||
pps_scaling_win_left_offset!=refScalingWinLeftOffset||
pps_scaling_win_right_offset!=refScalingWinRightOffset
pps_scaling_win_top_offset!=refScalingWinTopOffset||
pps_scaling_win_bottom_offset!=refScaling WinBottomOffset[[||
sps_num_subpics_minus1!=fRefNumSubpics]])
*NOTE – When the value of sps_num_subpics_minus1 is different for the current picture and the reference picture RefPicList[ i ][ j ], and for the current picture sps_subpic_treated_as_pic_flag[ k ] is equal to 1 for at least one value of k in the range of 0 to sps_num_subpics_minus1, inclusive, all tools, e.g., PROF, that cannot be used when RprConstraintsActiveFlag [ i ][ j ] is equal to 1 need to be turned off by the encoder, otherwise the bitstream would be a non-conforming bitstream due to that the extracted subpicture for which sps_subpic_treated_as_pic_flag [ k ] is equal to 1 would not be correctly decodable.*

6.2. Embodiment 2

This embodiment is for item 2.

8.3.2 Decoding Process for Reference Picture Lists Construction fRefWidth is set equal to CurrPicScalWin WidthL of the reference picture RefPicList[i][j]
fRefHeight is set equal to CurrPicScalWinHeightL of the reference picture RefPicList[i][j]
refPicWidth, refPicHeight, refScalingWinLeftOffset, refScalingWinRightOffset, refScaling WinTopOffset, and refScaling WinBottomOffset, are set equal to the values of pps_pic_width_in_luma_samples, pps_pic_height_in_luma_samples, pps_scaling_win_left_offset, pps_scaling_win_right_offset, pps_scaling_win_top_offset, and pps_scaling_win_bottom_offset, respectively, of the reference picture RefPicList[i][j]
fRefNumSubpics is set equal to sps_num_subpics_minus1 of the reference picture RefPicList[i][j]
RefPicScale[i][j][0]=((fRefWidth<<14)+(CurrPicScalWin WidthL>>1))/CurrPicScalWinWidthL
RefPicScale[i][j][1]=((fRefHeight<<14)+(CurrPicScalWinHeightL>>1))/CurrPicScalWinHeightL
RprConstraintsActiveFlag[i][j]=
(pps_pic_width_in_luma_samples!=refPicWidth||
pps_pic_height_in_luma_samples!=refPicHeight||
pps_scaling_win_left_offset!=refScalingWinLeftOffset||
pps_scaling_win_right_offset!=refScaling WinRightOffset||
pps_scaling_win_top_offset!=refScaling WinTopOffset||
pps_scaling_win_bottom_offset!=refScaling WinBottomOffset||
(sps_num_subpics_minus1!=fRefNumSubpics *&& sps_subpic_treated_as_pic_flag[ k ] is equal to 1 for at least one value of k in the range of 0 to sps_num_subpics_minus1, inclusive* ) )

6.3. Embodiment 3

This embodiment is for item 3.

8.3.2 Decoding Process for Reference Picture Lists Construction fRefWidth is set equal to CurrPicScalWinWidthL of the reference picture RefPicList[i][j]
fRefHeight is set equal to CurrPicScalWinHeightL of the reference picture RefPicList[i][j]
refPicWidth, refPicHeight, refScalingWinLeftOffset, refScalingWinRightOffset, refScaling WinTopOffset, and refScaling WinBottomOffset, are set equal to the values of pps_pic_width_in_luma_samples, pps_pic_height_in_luma_samples, pps_scaling_win_left_offset, pps_scaling_win_right_offset, pps_scaling_win_top_offset, and pps_scaling_win_bottom_offset, respectively, of the reference picture RefPicList[i][j]
fRefNumSubpics is set equal to sps_num_subpics_minus1 of the reference picture RefPicList[i][j]
*fNuhLayerId is set equal to nuh_layer_id of the reference picture RefPicList[ i ][ j ]*
RefPicScale[i][j][0]=((fRefWidth<<14)+(CurrPicScalWin WidthL>>1))/CurrPicScalWinWidthL
RefPicScale[i][j][1]=((fRefHeight<<14)+(CurrPicScalWinHeightL>>1))/CurrPicScalWinHeightL
RprConstraintsActiveFlag[i][j]=
(pps_pic_width_in_luma_samples!=refPicWidth||
pps_pic_height_in_luma_samples!=refPicHeight||
ps_scaling_win_left_offset!=refScaling WinLeftOffset||
pps_scaling_win_right_offset!=refScalingWinRight Offset||
pps_scaling_win_top_offset!=refScaling WinTopOffset||
pps_scaling_win_bottom_offset!=refScalingWin BottomOffset||
(sps_num_subpics_minus1!=fRefNumSubpics *&& nuh_layer_id != fNuhLayerId* ) )

6.4. Embodiment 4

This embodiment is for item 5. The PTL syntax is changed to be as follows:

| | Descriptor |
|---|---|
| profile_tier_level( profileTierPresentFlag, maxNumSubLayersMinus1 ) { | |
| if( profileTierPresentFlag ) { | |
| general_profile_idc | u(7) |
| general_tier_flag | u(1) |
| } | |
| general_level_idc | u(8) |
| if( profileTierPresentFlag ) { | |
| general_constraint_info( ) | |
| ptl_num_sub_profiles | u(8) |
| for( i = 0; i < ptl_num_sub_profiles; i++ ) | |
| general_sub_profile_idc[ i ] | u(32) |

-continued

| profile_tier_level( profileTierPresentFlag, maxNumSubLayersMinus1 ) { | Descriptor |
|---|---|
| } | |
| ... | |
| } | |

The GCI syntax is changed to be as follows:

| general_constraint_info( ) { | Descriptor |
|---|---|
| gci_num_constraint_bytes | u(8) |
| if( gci_num_constraint_bytes > 0 ) { | |
| general_non_packed_constraint_flag | u(1) |
| ... | u(1) |
| no_aps_constraint_flag | u(1) |
| for( i = numGciBits; i < | |
| (gci_num_constraint_bytes * 8 ); i++ ) | |
| gci_reserved_bit[ i ] | u(1) |
| } | |
| } | | gci_num_constraint_bytes specifies the number of bytes of all syntax elements in the general_constraint_info( )syntax structure, excluding this syntax element itself.

The variable numGciBits is derived to be equal to the number of bits for all the syntax elements under the condition "if(gci_num_constraint_bytes>0)", excluding the gci_reserved_bit[i] syntax elements.

The number of gci_reserved_bit[i] syntax elements shall be less than or equal to 7.

Alternatively, the value of gci_num_constraint_bytes shall be equal to 0 or Ceil(Log 2(numGciBits)).

gci_reserved_bit[i] can have any value. Decoders shall ignore the value of gci_reserved_bit[i], when present.

6.5. Embodiment 5

This embodiment is for item 6. The PTL syntax is changed to be as follows:

| profile_tier_level( profileTierPresentFlag, maxNumSubLayersMinus1 ) { | Descriptor |
|---|---|
| if( profileTierPresentFlag) { | |
| general_profile_idc | u(7) |
| general_tier_flag | u(1) |
| } | |
| general_level_idc | u(8) |
| if( profileTierPresentFlag) { | |
| ptl_num_sub_profiles | u(8) |
| for( i = 0; i < ptl_num_sub_profiles; i++ ) | |
| general_sub_profile_idc[ i ] | u(32) |
| } | |
| if( profileTierPresentFlag) | |
| general_constraint_info( ) | |
| ... | |
| } | |

The GCI syntax is changed to be as follows:

| general_constraint_info( ) { | Descriptor |
|---|---|
| gci_present_flag | u(1) |
| if( gci_present_flag) { | |
| general_non_packed_constraint_flag | u(1) |
| ... | u(1) |
| no_aps_constraint_flag | u(1) |

| general_constraint_info( ) { | Descriptor |
|---|---|
| for( i = numGciBits; i < | |
| ( gciNumConstraintBytes * 8 ); i++ | |
| ) | |
| gci_reserved_bit[ i ] | u(1) |
| } | |
| } | | gci_present_flag equal to 1 specifies that GCI fields are present. gci_present_flag equal to 0 specifies that GCI fields are not present.

The variable numGciBits is derived to be equal to the number of bits for all the syntax elements under the condition "if(gci_present_flag)", excluding the gci_reserved_bit[i] syntax elements.

When gci_present_flag is equal to 1, the variable gciNumConstraintBytes is set equal to Ceil(Log 2(numGciBits)).

NOTE: The number of gci_reserved_bit[i] syntax elements is less than or equal to 7.

6.6. Embodiment 6

The PTL syntax is changed to be as follows:

| profile_tier_level( profileTierPresentFlag, maxNumSubLayersMinus1 ) { | Descriptor |
|---|---|
| if( profileTierPresentFlag) { | |
| general_profile_idc | u(7) |
| general_tier_flag | u(1) |
| } | |
| general_level_idc | u(8) |
| if( profileTierPresentFlag) { | |
| ptl_num_sub_profiles | u(8) |
| for( i = 0; i < ptl_num_sub_profiles; i++ ) | |
| general_sub_profile_idc[ i ] | u(32) |
| } | |
| if( profileTierPresentFlag) { | |
| gci_present_flag | u(1) |
| if ( gci_present_flag ) | |
| general_constraint_info( ) | |
| } | |
| for( i = 0; i < maxNumSubLayersMinus1; i++ ) | |
| ptl_sublayer_level_present_flag[ i ] | u(1) |
| while( !byte_aligned( ) ) | |
| ptl_alignment_zero_bit | f(1) |
| ... | |
| } | |

The GCI syntax is changed to be as follows:

| general_constraint_info( ) { | Descriptor |
|---|---|
| general_non_packed_constraint_flag | u(1) |
| ... | u(1) |
| no_aps_constraint_flag | u(1) |
| for( i = numGciBits; i < | |
| ( gciNumConstraintBytes * 8 ); i++ | |
| ) | |
| gci_reserved_bit[ i ] | u(1) |
| } | | gci_present_flag equal to 1 specifies that general_constraint_info( ) is present. gci_present_flag equal to 0 specifies that general_constraint_info( ) is not present.

The variable numGciBits is derived to be equal to the number of bits for all the syntax elements excluding the gci_reserved_bit[i] syntax elements.

The variable gciNumConstraintBytes is set equal to Ceil (Log 2(numGciBits)).

NOTE: The number of gci_reserved_bit[i] syntax elements is less than or equal to 7.

FIG. 1 is a block diagram showing an example video processing system 1900 in which various embodiments disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 2:
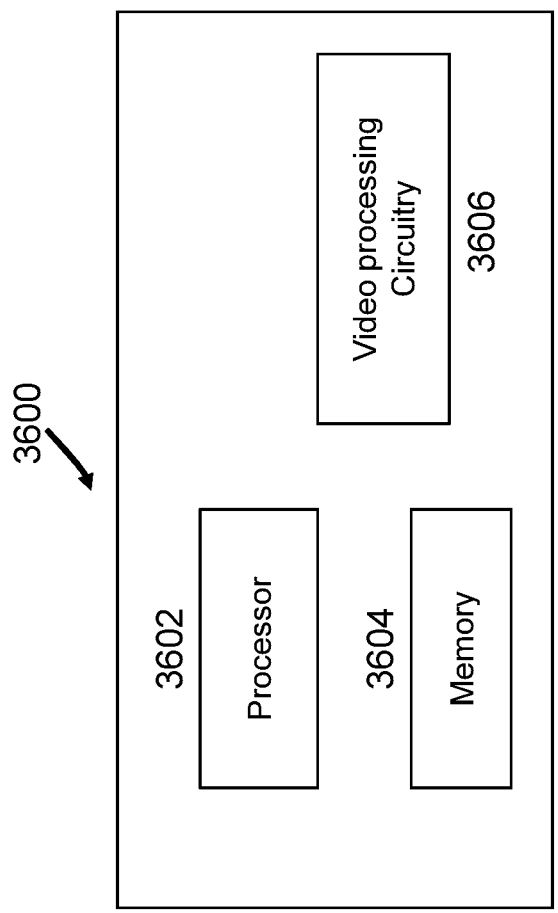
FIG. 2 is a block diagram of an example hardware platform used for video processing.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IOT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and embodiments described herein. The video processing hardware 3606 may be used to implement, in hardware circuitry, some embodiments described in the present disclosure.

Figure 4:
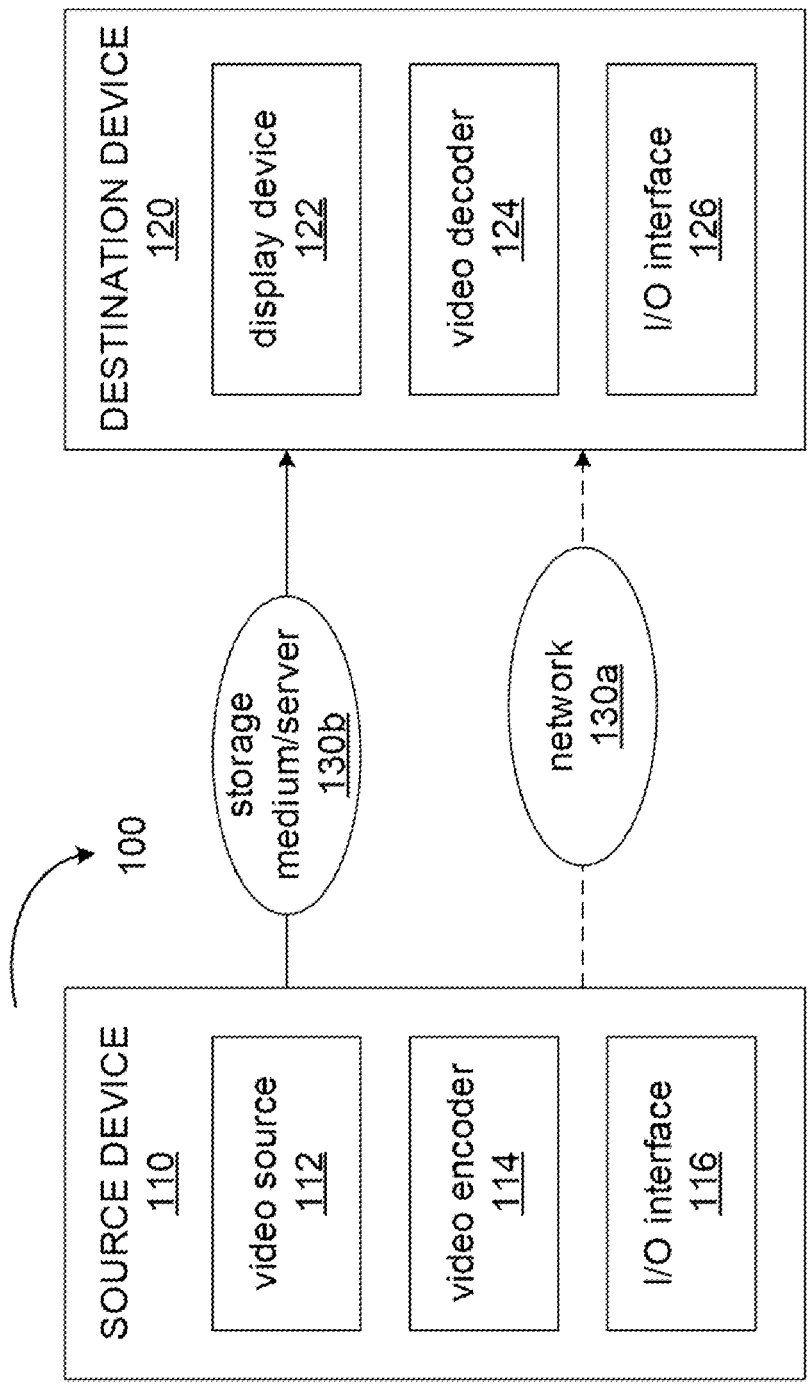
FIG. 4 is a block diagram that illustrates an example video coding system.

FIG. 4 is a block diagram that illustrates an example video coding system 100 that may utilize the embodiments of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
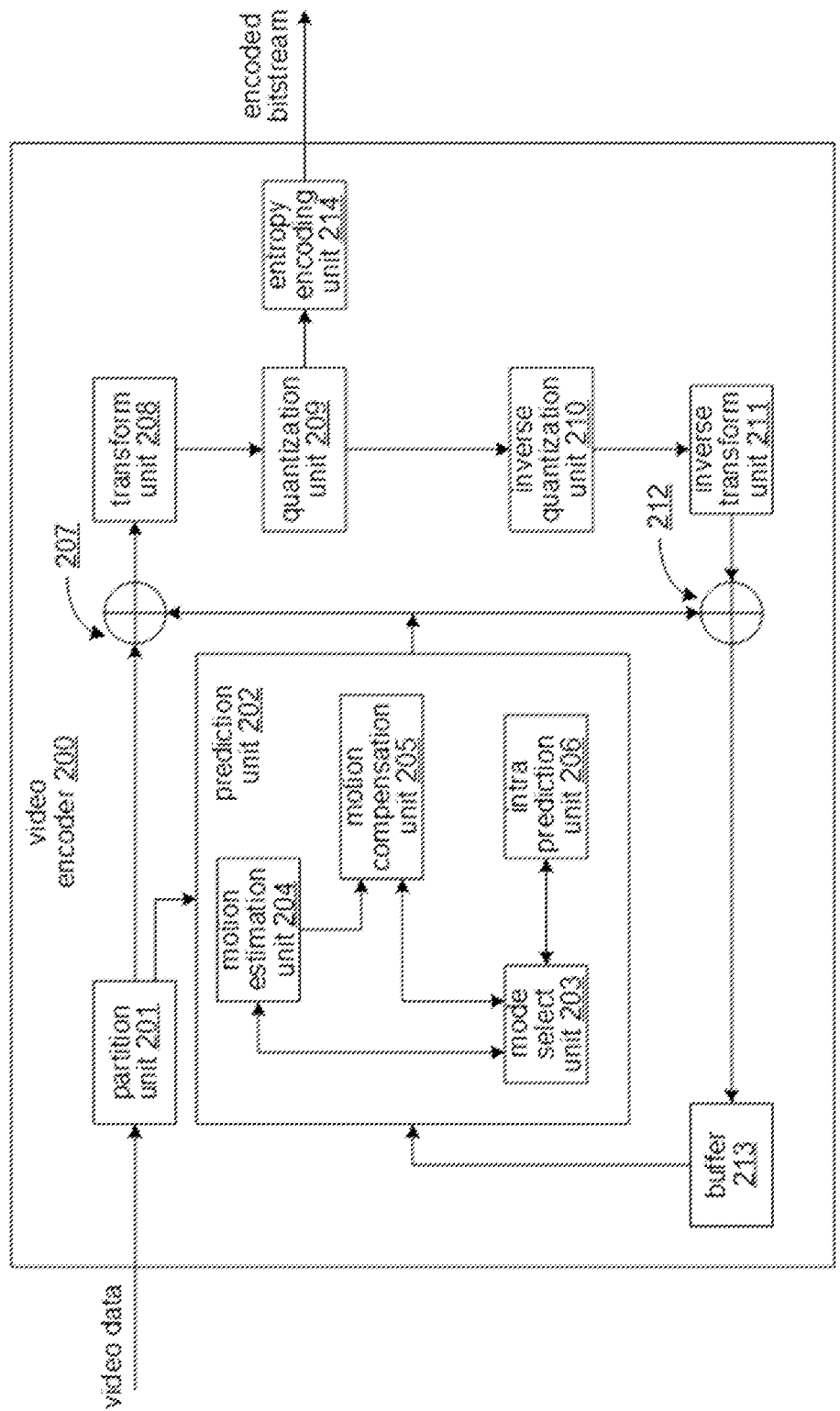
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the embodiments of this disclosure. In the example of FIG. 5, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201; a prediction unit 202, which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
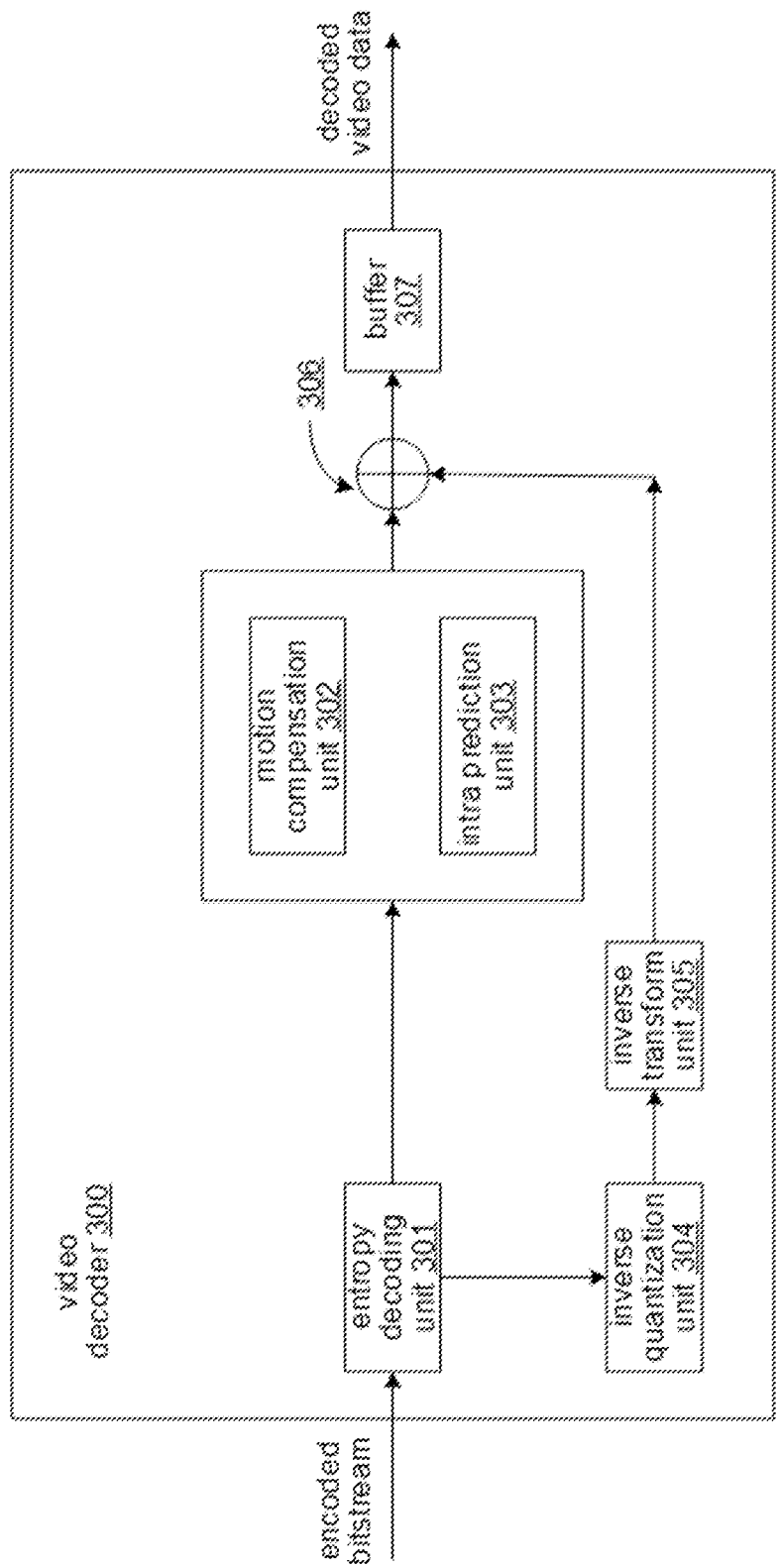
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the embodiments of this disclosure. In the example of FIG. 5, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 6, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show examples of embodiments discussed in the previous section (e.g., items 1-3).

Figure 3:
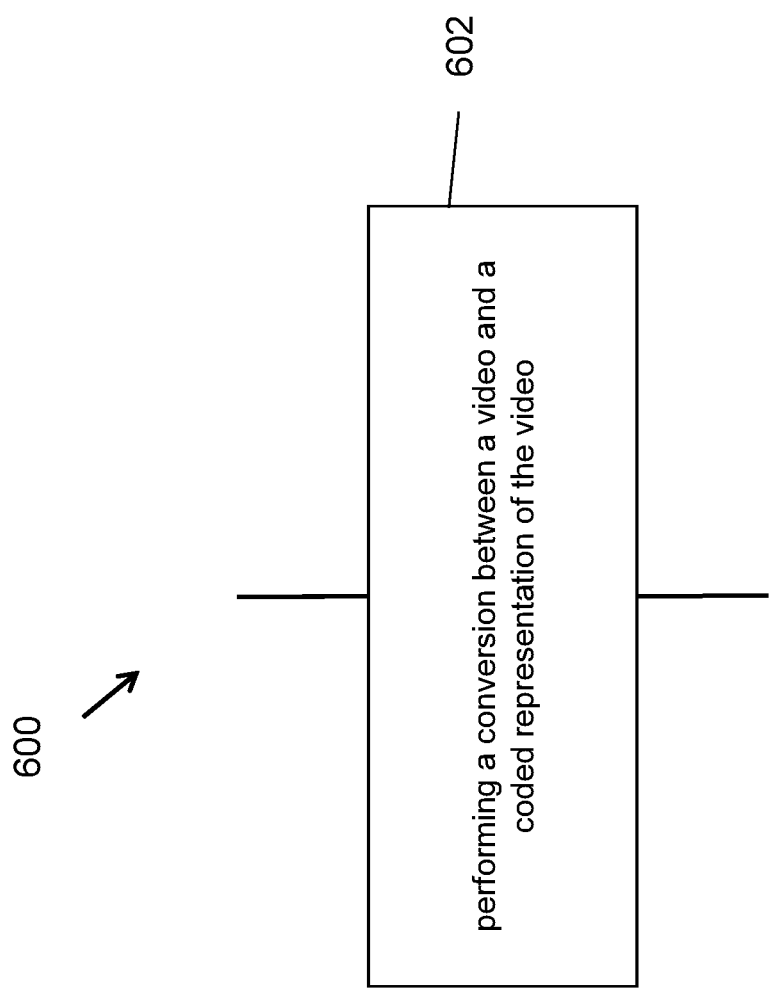
FIG. 3 is a flowchart for an example method of video processing.

1. A method of video processing (e.g., method 600 in FIG. 3), comprising performing (602) a conversion between a video and a coded representation of the video, wherein the coded representation conforms to a format rule, wherein the format rule specifies usage of a syntax field indicative of applicability of reference picture resampling to a corresponding segment of video.

The following solutions show examples of embodiments discussed in the previous section (e.g., item 1).

2. The method of solution 1, wherein, the rule specifies that a value of the syntax field is derived independent of a value of subpictures included in a sequence parameter set corresponding to the video segment.

The following solutions show examples of embodiments discussed in the previous section (e.g., item 2).

3. The method of any of solutions 1-2, wherein, the rule specifies that the value of the syntax field is derived based on whether subpictures are treated as pictures for the conversion.

The following solutions show examples of embodiments discussed in the previous section (e.g., item 3).

4. The method of any of solutions 1-3, wherein, the rule specifies that the value of the syntax field is derived based on whether a current picture and a reference picture of the current picture belong to a same layer and/or whether inter-layer prediction is allowed.

The following solutions show examples of embodiments discussed in the previous section (e.g., item 4).

5. A video processing method, comprising: performing a conversion between a video and a coded representation of the video, wherein the coded representation conforms to a format rule, wherein the format rule specifies constraining a value of a first syntax element in a picture header or a slice header based on a value of a second syntax element corresponding to an access unit delimiter.

The following solutions show examples of embodiments discussed in the previous section (e.g., items 5-6).

6. A video processing method, comprising: performing a conversion between a video and a coded representation of the video, wherein the coded representation conforms to a format rule, wherein the format rule specifies whether and how one or more syntax elements in a general constraint information field are included.

7. The method of solution 6, wherein the rule specifies that whether the one or more syntax elements are included in the coded representation is based on a number of bytes of a second field in the coded representation.

8. The method of any of solutions 6-7, wherein the rule specifies a presence of a number of reserved bits when the one or more syntax elements are includes in the general constraint information syntax element.

9. The method of any of solutions 1-8, wherein the performing the conversion comprises encoding the video to generate the coded representation.

10. The method of any of solutions 1-8, wherein the performing the conversion comprises parsing and decoding the coded representation to generate the video.

11. A video decoding apparatus comprising a processor configured to implement a method recited in one or more of solutions 1 to 10.

12. A video encoding apparatus comprising a processor configured to implement a method recited in one or more of solutions 1 to 10.

13. A computer program product having computer code stored thereon, the code, when executed by a processor, causes the processor to implement a method recited in any of solutions 1 to 10.

14. A method, apparatus or system described in the present disclosure.

Figure 7:
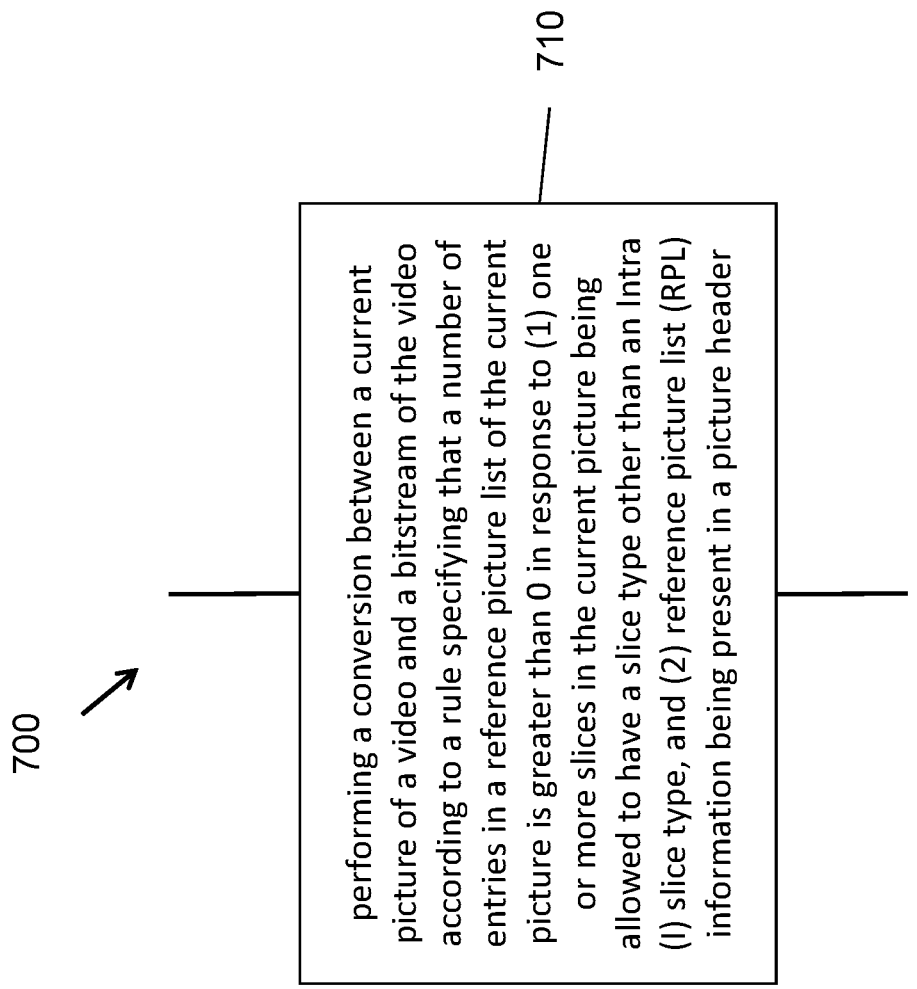
FIG. 7 is a flowchart representation of a method for processing video data in accordance with one or more embodiments of the present disclosure.

FIG. 7 is a flowchart representation of a method 700 for processing video data in accordance with one or more embodiments of the present disclosure. The method 700 includes, at operation 710, performing a conversion between a current picture of a video and a bitstream of the video according to a rule. The rule specifies that a number of entries in a reference picture list of the current picture is greater than 0 in response to (1) one or more slices in the current picture being allowed to have a slice type other than an Intra (I) slice type, and (2) reference picture list (RPL) information being present in a picture header.

In some embodiments, the reference picture list is a reference picture list 0. In some embodiments, a first syntax flag in the picture header indicates whether the one or more slices in the current picture are allowed to have a slice type other than an Intra (I) slice type. In some embodiments, a second syntax flag in a picture parameter set indicates whether the RPL information is present in the picture header instead of the slice headers. In some embodiments, in response to the RPL information being present in the picture header, the number of entries in the reference picture list 0 is 0 only when all of the one or more slices in the current picture are Intra (I) slices. In some embodiments, in response to the RPL information being present in the picture header, the number of entries in the reference picture list 0 is greater than 0 when at least one of the one or more slices in the current picture is a Predicted (P) slice or a Bidirectional predicted (B) slice.

In some embodiments, whether and/or how the number of entries in the reference picture list 0 of the current picture is present in the bitstream is based on whether the one or more slices in the current picture are allowed to have a slice type other than an Intra (I) slice type. In some embodiments, the number of entries in the reference picture list 0 of the current picture is indicated in the bitstream as (the number of entries in the reference picture list 0-1) in response to the one or more slices in the current picture being allowed to have a slice type other than an Intra (I) slice type. In some embodiments, the number of entries in the reference picture list 0 of the current picture is not present in the bitstream in response to the one or more slices in the picture being Intra (I) slices only. In some embodiments, all of the one or more slices of the current picture are Intra slices in response to the number of entries in a reference picture list 0 of the current picture being equal to 0. In some embodiments, the first syntax flag has a value of 0 indicating that all of the one or more slices of the current picture are Intra slices. In some embodiments, whether and/or how (1) whether one or more slices in the current picture are allowed to have a slice type other than an Intra (I) slice type, and (2) whether reference picture list (RPL) information is present in a picture header are indicated in the bitstream is based on a number of entries in the reference picture list 0 or 0 reference picture 1 of the current picture. In some embodiments, in case the number of entries in the reference picture list 0 is equal to 0, the first syntax flag in the picture header indicating whether the one or more slices in the current picture are allowed to have a slice type other than an Intra (I) slice type is omitted in the bitstream. In some embodiments, in case the number of entries in the reference picture list 0 is equal to 0, all of the one or more slices in the current picture are Intra slices. In some embodiments, in case the number of entries in the reference picture list 1 is equal to 0, none of the one or more slices in the current picture is Bidirectional predicted slices. In some embodiments, in case the number of entries in the reference picture list 1 is equal to 0, the one or more slices in the current picture are either Intra slices or Predicted slices.

Figure 8:
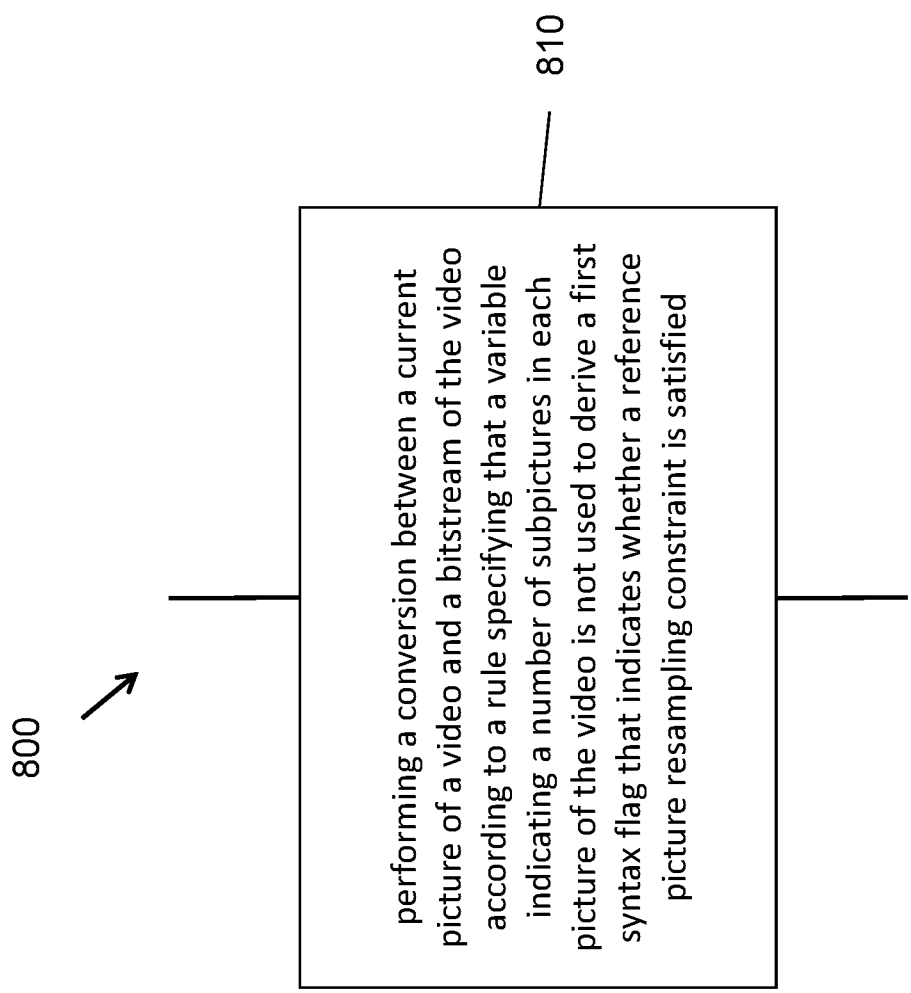
FIG. 8 is a flowchart representation of another method for processing video data in accordance with one or more embodiments of the present disclosure.

FIG. 8 is a flowchart representation of a method 800 for processing video data in accordance with one or more embodiments of the present disclosure. The method 800 includes, at operation 810, performing a conversion between a current picture of a video and a bitstream of the video according to a rule. The rule specifies that a variable indicating a number of subpictures in each picture of the video is not used to derive a first syntax flag that indicates whether a reference picture resampling constraint is satisfied.

In some embodiments, the rule further specifies that, in case (1) the number of subpictures in the current picture is different than the number of subpictures in a reference picture of the current picture and (2) at least one subpicture is associated with a flag indicating that the subpicture is treated as a picture, a coding tool that is compatible with the reference picture resampling constraint being satisfied is disabled. In some embodiments, the rule specifies that the variable is not used to derive a second syntax flag indicating whether reference picture resampling is enabled. In some embodiments, the rule is applicable to the conversion in response to interlayer prediction being allowed.

Figure 9:
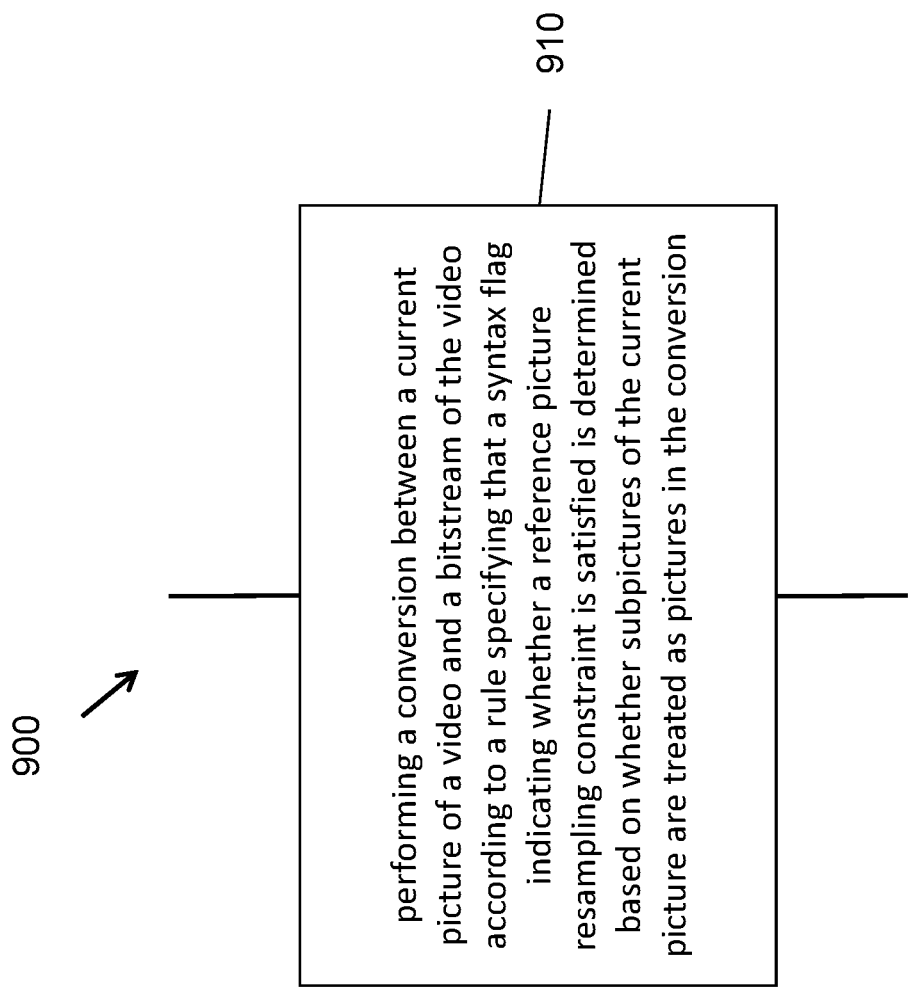
FIG. 9 is a flowchart representation of another method for processing video data in accordance with one or more embodiments of the present disclosure.

FIG. 9 is a flowchart representation of a method 900 for processing video data in accordance with one or more embodiments of the present disclosure. The method 900 includes, at operation 910, performing a conversion between a current picture of a video and a bitstream of the video according to a rule. The rule specifies that a syntax flag indicating whether a reference picture resampling constraint is satisfied is determined based on whether subpictures of the current picture are treated as pictures in the conversion.

In some embodiments, subpictures of a picture are associated with variables each indicating whether a corresponding subpicture is treated as a picture, and the syntax flag is determined based on at least one of the variables. In some embodiments, reference picture resampling is allowed in case a number of subpictures of the current picture is different than a number of subpictures of a reference picture of the current picture and none of the subpictures of the current picture is treated as a picture. In some embodiments, the syntax flag indicating whether the reference picture resampling constraint for reference picture resampling is determined according to a scaling size or a scaling offset. In some embodiments, reference picture resampling is always enabled in case a number of subpictures of the current picture is different than a number of subpictures of a reference picture of the current picture and at least one of the subpictures of the current picture is treated as a picture.

In some embodiments, a coding tool associated with the reference picture resampling is disabled in response to the reference picture resampling constraint for reference picture resampling being satisfied. In some embodiments, the coding tool comprises Prediction Refinement with Optical Flow (PROF), Bi-Directional Optical Flow (BDOF), or Decoder-side Motion Vector Refinement (DMVR). In some embodiments, a coding tool associated with the reference picture resampling is disabled in response to a subpicture in the current picture being treated as a picture and the number of subpictures of the current picture being different than the number of subpictures of a reference picture of the current picture.

Figure 10:
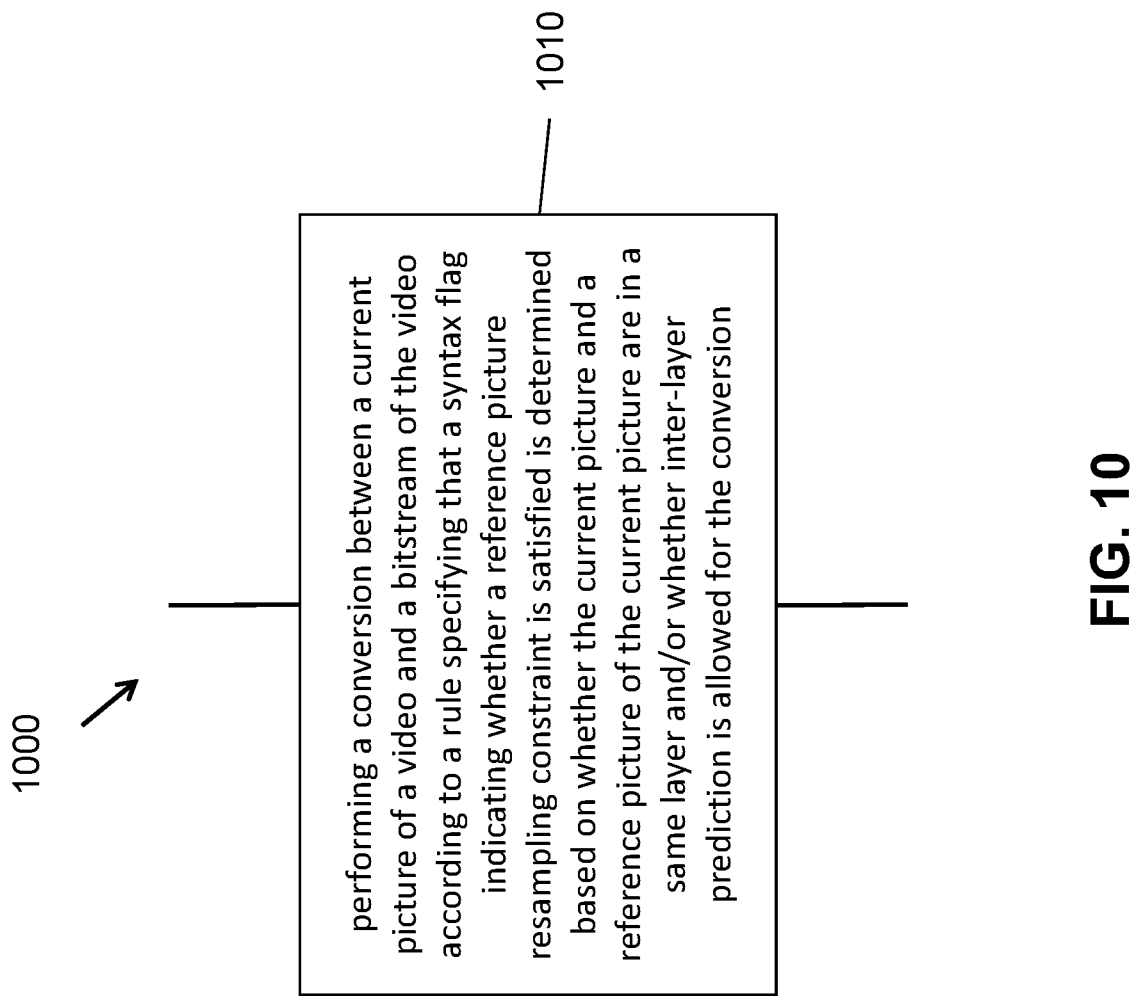
FIG. 10 is a flowchart representation of another method for processing video data in accordance with one or more embodiments of the present disclosure.

FIG. 10 is a flowchart representation of a method 1000 for processing video data in accordance with one or more embodiments of the present disclosure. The method 1000 includes, at operation 1010, performing a conversion between a current picture of a video and a bitstream of the video according to a rule. The rule specifies that a syntax flag indicating whether a reference picture resampling constraint is satisfied is determined based on whether the current picture and a reference picture of the current picture are in a same layer and/or whether inter-layer prediction is allowed for the conversion. In some embodiments, the syntax flag in represented as RprConstraintsActiveFlag in the bitstream.

Figure 11:
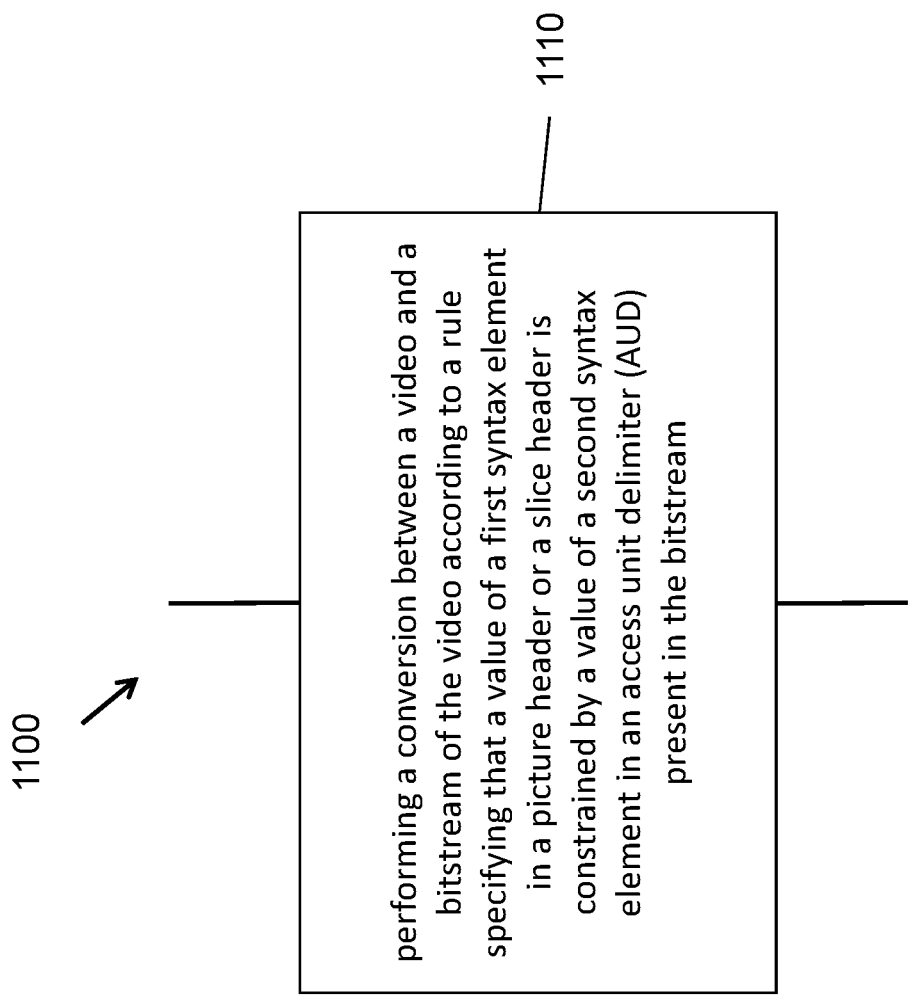
FIG. 11 is a flowchart representation of another method for processing video data in accordance with one or more embodiments of the present disclosure.

FIG. 11 is a flowchart representation of a method 1100 for processing video data in accordance with one or more embodiments of the present disclosure. The method 1100 includes, at operation 1110, performing a conversion between a video and a bitstream of the video according to a rule. The rule specifies that a value of a first syntax element in a picture header or a slice header is constrained by a value of a second syntax element in an access unit delimiter (AUD) present in the bitstream.

In some embodiments, the first syntax element in the picture header specifies whether the current picture is a Gradual Decoding Refresh (GDR) picture or an Intra Random Access Point (IRAP) picture, and the second syntax element in the AUD specifies whether an access unit containing the AUD is a GDR access unit or an IRAP access unit. In some embodiments, in response to the second syntax element specifying that the access unit is not a GRD access unit nor or an IRAP access, the first syntax element is not equal to a specific value. In some embodiments, the specific value is 1. In some embodiments, the second syntax element is present or not present in the bitstream. In some embodiments, the first syntax element is equal to 0. In some embodiments, the first syntax element in the slice header specifies a slice type of a slice in the current picture, and the second syntax element specifies slice types associated with an access unit containing the AUD. In some embodiments, in response to the second syntax element specifying that the slice types associated with the access unit are Intra slices, the first element is not equal to a specific value indicating that slices of the slice are Predicted slices or Bidirectional predicted slices. In some embodiments, the specific value is 0 or 1. In some embodiments, the second syntax element is present or not present in the bitstream. In some embodiments, the first syntax element is equal to 2. In some embodiments, the first syntax element in the slice header is not equal to a specific value in response to the second syntax element specifying that a slice type present in the access unit is a Predicted slice or an Intra slice. In some embodiments, the first syntax element is equal to 1 or 2 in response to the second syntax element being equal to 1. In some embodiments, the first syntax element is not equal to 0 in response to the second syntax element being equal to 1.

In some embodiments, the value of the first syntax element and the value of the second syntax element are aligned. In some embodiments, a name of the first syntax element and a name of the second syntax element are aligned. In some embodiments, the first syntax element in the picture header specifies whether the current picture is a Gradual Decoding Refresh (GDR) picture or an Intra Random Access Point (IRAP) picture, and the second syntax element specifying whether the bitstream is a single-layer bitstream or whether the current picture belongs to an IRAP access unit or the GDR access unit. In some embodiments, in response to the second syntax element specifying that the bitstream is a single-layer bitstream, the first syntax element specifies that the access unit is not an IRAP or GDR access unit. In some embodiments, the value of the first syntax element is not equal to a specific value. In some embodiments, in response to the second syntax element specifying that the bitstream is a single-layer bitstream, the first syntax element specifies that the access unit is an IRAP or GDR access unit.

Figure 12:
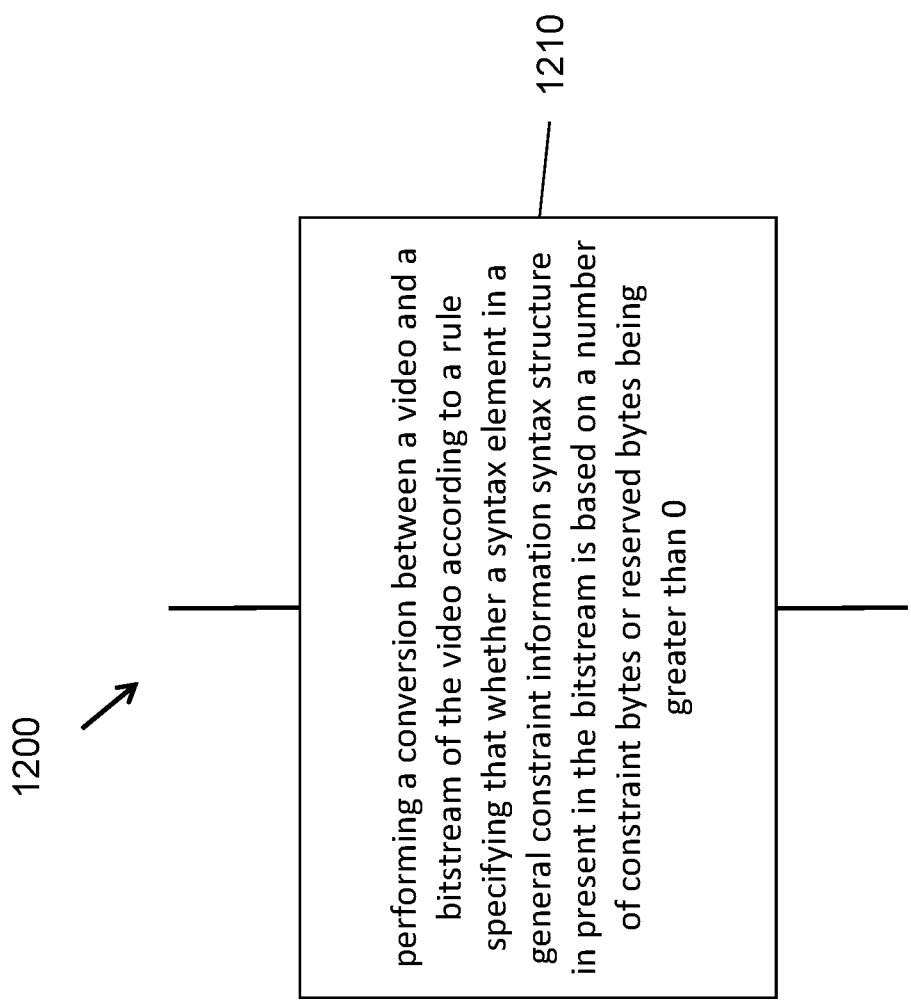
FIG. 12 is a flowchart representation of another method for processing video data in accordance with one or more embodiments of the present techno disclosure logy.

FIG. 12 is a flowchart representation of a method 1200 for processing video data in accordance with one or more embodiments of the present disclosure. The method 1200 includes, at operation 1210, performing a conversion between a video and a bitstream of the video according to a rule. The rule specifies that whether a syntax element in a general constraint information syntax structure in present in the bitstream is based on a number of constraint bytes or reserved bytes being greater than 0.

In some embodiments, the number of constraint or reserved bytes is limited to a specific value based on a characteristic of the video. In some embodiments, the characteristic comprises syntax elements of the general constraint information, a profile of the video, or a version of standard information. In some embodiments, a syntax flag is used to indicate whether the syntax element in the general constraint information syntax structure in present in the bitstream, and, in response to the syntax flag indicating that the syntax element is present, a total number of bits is aligned to 8×N using one or more reserved bits, where N is a positive integer. In some embodiments, in response to the syntax flag indicating that the syntax element is not present, seven reserved bits are included in the bitstream. In some embodiments, in response to the syntax flag indicating that the syntax element is present, the general constraint information syntax structure is present in the bitstream. In some embodiments, in response to the syntax flag indicating that the syntax element is not present, values of the general constraint information syntax structure are determined according to default values. In some embodiments, the general constraint information syntax structure is positioned after a general profile syntax structure or after another syntax structure specifying whether level information is present for a sublayer representation.

FIG. 13 is a flowchart representation of a method 1300 for processing video data in accordance with one or more embodiments of the present disclosure. The method 1300 includes, at operation 1310, performing a conversion between a current block of a video and a bitstream of the video according to a rule. The rule specifies that usage of adaptive color transform is selectively indicated based on information about one or more prediction modes applicable to the current block.

In some embodiments, a syntax flag indicating whether the adaptive color transform is enabled is based on whether a prediction mode of the current block is non-intra, non-inter, and/or non-intra-block-copy (IBC). In some embodiments, the usage of adaptive color transform is not indicated in the bitstream in response to none of the intra, inter, or IBC prediction mode is applicable to the current block. In some embodiments, in response to the adaptive color transform being applied to the current block, a different coding mode is not used for the current block. In some embodiments, the different coding mode comprises a palette coding mode.

In some embodiments, the conversion comprises encoding the video into the bitstream. In some embodiments, the conversion comprises decoding the video from the bitstream.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:
 performing a conversion between a current picture of a video and a bitstream of the video according to a first rule,
 wherein the first rule includes a bitstream constraint which specifies that a number of entries in a reference picture list of the current picture is greater than 0 in response to (1) one or more slices in the current picture being allowed to have a slice type other than an Intra (I) slice type, and (2) reference picture list (RPL) information being present in a picture header,
 wherein the current picture of the video comprises a current video block, wherein a range of a value of a fourth syntax element specifying a number of points in a quantization parameter (QP) table associated with the conversion of the current video block is dependent on one or more other syntax elements comprising a fifth syntax element according to a second rule, and wherein the second rule specifies that the range of the value of the fourth syntax element is based on a value of the fifth syntax element specifying a starting luma and chroma QP used to describe the QP table.

2. The method of claim 1, wherein the reference picture list is a reference picture list 0.

3. The method of claim 1, wherein a first syntax flag in the picture header indicates whether the one or more slices in the current picture are allowed to have the slice type other than the Intra (I) slice type.

4. The method of claim 1, wherein a second syntax flag in a picture parameter set indicates whether the RPL information is present in the picture header instead of slice headers.

5. The method of claim 1, wherein the number of entries in the reference picture list of the current picture is indicated by a third syntax element included in the bitstream.

6. The method of claim 1, wherein the QP table is an i-th chroma QP mapping table.

7. The method of claim 6, wherein a maximum allowed value of the fourth syntax element is equal to (K—the value of the fifth syntax element), wherein K is a positive integer.

8. The method of claim 7, wherein the fifth syntax element is represented as sps_qp_table_start_minus26 [i] whose value plus 26 specifies the starting luma and chroma QP used to describe the i-th chroma QP mapping table.

9. The method of claim 8, wherein the maximum allowed value of the fourth syntax element is equal to (36-sps_qp_table_start_minus26 [i]).

10. The method of claim 1, wherein the second rule further specifies that the current picture is a recovery point picture in response to the current picture being a gradual decoding refresh (GDR) picture with a recovery picture order count (POC) count of 0, and wherein the recovery POC count specifies a recovery point of decoded pictures in an output order.

11. The method of claim 1, wherein the conversion comprises encoding the video into the bitstream.

12. The method of claim 1, wherein the conversion comprises decoding the video from the bitstream.

13. An apparatus for processing video data comprising a processor and a non-transitory memory with instructions thereon, wherein the instructions upon execution by the processor, cause the processor to:

perform a conversion between a current picture of a video and a bitstream of the video according to a first rule, wherein the first rule includes a bitstream constraint which specifies that a number of entries in a reference picture list of the current picture is greater than 0 in response to (1) one or more slices in the current picture being allowed to have a slice type other than an Intra (I) slice type, and (2) reference picture list (RPL) information being present in a picture header, wherein the current picture of the video comprises a current video block, wherein a range of a value of a fourth syntax element specifying a number of points in a quantization parameter (QP) table associated with the conversion of the current video block is dependent on one or more other syntax elements comprising a fifth syntax element according to a second rule, and wherein the second rule specifies that the range of the value of the fourth syntax element is based on a value of the fifth syntax element specifying a starting luma and chroma QP used to describe the QP table.

14. The apparatus of claim 13, wherein the reference picture list is a reference picture list 0, wherein a first syntax flag in the picture header indicates whether the one or more slices in the current picture are allowed to have the slice type other than the Intra (I) slice type, wherein a second syntax flag in a picture parameter set indicates whether the RPL information is present in the picture header instead of slice headers, and wherein the number of entries in the reference picture list of the current picture is indicated by a third syntax element included in the bitstream.

15. The apparatus of claim 13, wherein the QP table is an i-th chroma QP mapping table, wherein a maximum allowed value of the fourth syntax element is equal to (K—the value of the fifth syntax element), wherein K is a positive integer, wherein the fifth syntax element is represented as sps_qp_table_start_minus26 [i] whose value plus 26 specifies the starting luma and chroma QP used to describe the i-th chroma QP mapping table, and wherein the maximum allowed value of the fourth syntax element is equal to (36-sps_qp_table_start_minus26 [i]).

16. The apparatus of claim 13, wherein the second rule further specifies that the current picture is a recovery point picture in response to the current picture being a gradual decoding refresh (GDR) picture with a recovery picture order count (POC) count of 0, and wherein the recovery POC count specifies a recovery point of decoded pictures in an output order.

17. A non-transitory computer-readable storage medium storing instructions that cause a processor to:

perform a conversion between a current picture of a video and a bitstream of the video according to a first rule, wherein the first rule includes a bitstream constraint which specifies that a number of entries in a reference picture list of the current picture is greater than 0 in response to (1) one or more slices in the current picture being allowed to have a slice type other than an Intra (I) slice type, and (2) reference picture list (RPL) information being present in a picture header, wherein the current picture of the video comprises a current video block, wherein a range of a value of a fourth syntax element specifying a number of points in a quantization parameter (QP) table associated with the conversion of the current video block is dependent on one or more other syntax elements comprising a fifth syntax element according to a second rule, and wherein the second rule specifies that the range of the value of the fourth syntax element is based on a value of the fifth syntax element specifying a starting luma and chroma QP used to describe the QP table.

18. The non-transitory computer-readable storage medium of claim 17, wherein the reference picture list is a reference picture list 0, wherein a first syntax flag in the picture header indicates whether the one or more slices in the current picture are allowed to have the slice type other than the Intra (I) slice type, wherein a second syntax flag in a picture parameter set indicates whether the RPL information is present in the picture header instead of slice headers, and wherein the number of entries in the reference picture list of the current picture is indicated by a third syntax element included in the bitstream.

19. A non-transitory computer-readable recording medium storing a bitstream of a video which is generated by a method performed by a video processing apparatus, wherein the method comprises:

generating the bitstream of the video from a current picture in the video according to a first rule, wherein the first rule includes a bitstream constraint which specifies that a number of entries in a reference picture list of the current picture is greater than 0 in response to (1) one or more slices in the current picture being allowed to have a slice type other than an Intra (I) slice type, and (2) reference picture list (RPL) information being present in a picture header, wherein the current picture of the video comprises a current video block, wherein a range of a value of a fourth syntax element specifying a number of points in a quantization parameter (QP) table associated with a conversion of the current video block is dependent on one or more other syntax elements comprising a fifth syntax element according to a second rule, and wherein the second rule specifies that the range of the value of the fourth syntax element is based on a value of the fifth syntax element specifying a starting luma and chroma QP used to describe the QP table.

20. The non-transitory computer-readable recording medium of claim 19, wherein the reference picture list is a reference picture list 0, wherein a first syntax flag in the picture header indicates whether the one or more slices in the current picture are allowed to have the slice type other than the Intra (I) slice type, wherein a second syntax flag in a picture parameter set indicates whether the RPL information is present in the picture header instead of slice headers, and wherein the number of entries in the reference picture list of the current picture is indicated by a third syntax element included in the bitstream.

* * * * *